(12) United States Patent
Hefner, Jr.

(10) Patent No.: US 9,371,414 B2
(45) Date of Patent: *Jun. 21, 2016

(54) EPOXY RESIN ADDUCTS AND THERMOSETS THEREOF

(75) Inventor: Robert E. Hefner, Jr., Rosharon, TX (US)

(73) Assignee: BLUE CUBE IP LLC, Midland, MI (US)

(*) Notice: Subject to any disclaimer, the term of this patent is extended or adjusted under 35 U.S.C. 154(b) by 97 days.

This patent is subject to a terminal disclaimer.

(21) Appl. No.: 13/817,017

(22) PCT Filed: Sep. 8, 2011

(86) PCT No.: PCT/US2011/050742
§ 371 (c)(1),
(2), (4) Date: Feb. 14, 2013

(87) PCT Pub. No.: WO2012/050688
PCT Pub. Date: Apr. 19, 2012

(65) Prior Publication Data
US 2013/0144015 A1 Jun. 6, 2013

Related U.S. Application Data

(60) Provisional application No. 61/388,067, filed on Sep. 30, 2010.

(51) Int. Cl.
| C08G 59/14 | (2006.01) |
| C08L 63/00 | (2006.01) |
| C08G 59/24 | (2006.01) |
| C08G 59/18 | (2006.01) |

(52) U.S. Cl.
CPC .......... *C08G 59/1477* (2013.01); *C08G 59/184* (2013.01); *C08G 59/24* (2013.01); *C08L 63/00* (2013.01)

(58) Field of Classification Search
CPC .................................................. C08G 59/1477
USPC ....................................................... 525/524
See application file for complete search history.

(56) References Cited

U.S. PATENT DOCUMENTS

| 3,256,226 | A | | 6/1966 | Fekete et al. |
| 3,271,363 | A | | 9/1966 | Nikles et. al. |
| 3,297,724 | A | * | 1/1967 | McConnell et al. .......... 549/560 |
| 3,639,655 | A | | 2/1972 | Jones |
| 3,864,316 | A | | 2/1975 | Robinson |
| 4,125,558 | A | | 11/1978 | Torsi |
| 4,284,574 | A | * | 8/1981 | Bagga ........................ 549/555 |
| 4,315,044 | A | * | 2/1982 | Elmore et al. .............. 427/386 |
| 4,373,073 | A | | 2/1983 | Wojtech et al. |
| 4,417,033 | A | | 11/1983 | Bowditch |
| 4,544,731 | A | | 10/1985 | Cavitt et al. |
| 5,128,491 | A | | 7/1992 | Cheng |
| 5,239,093 | A | * | 8/1993 | Cheng ........................ 549/517 |
| 5,310,770 | A | * | 5/1994 | DeGooyer et al. .......... 523/414 |
| 5,780,582 | A | | 7/1998 | Wang et al. |
| 5,959,061 | A | | 9/1999 | Neumann et al. |
| 6,211,389 | B1 | | 4/2001 | Dimke |
| 6,410,807 | B1 | | 6/2002 | Yang et al. |
| 6,677,468 | B1 | | 1/2004 | Dimke et al. |
| 8,318,834 | B2 | | 11/2012 | Hefner, Jr. et al. |
| 2002/0161106 | A1 | | 10/2002 | Anderson |
| 2006/0235183 | A1 | | 10/2006 | Ogura et al. |
| 2007/0087146 | A1 | | 4/2007 | Evans et al. |
| 2007/0117938 | A1 | | 5/2007 | Martz et al. |
| 2007/0281179 | A1 | | 12/2007 | Ambrose et al. |
| 2011/0039982 | A1 | | 2/2011 | Hefner, Jr. et al. |
| 2011/0040046 | A1 | | 2/2011 | Hefner, Jr. et al. |
| 2011/0054056 | A1 | | 3/2011 | Hefner, Jr. et al. |

FOREIGN PATENT DOCUMENTS

| EP | 012160 | A1 | 6/1980 | |
| EP | 0253405 | A2 | 1/1988 | |
| EP | 0702042 | A1 | 3/1996 | |
| GB | 120476 | A | 11/1918 | |
| JP | 2006083306 | A | * 3/2006 | ............. C08G 59/22 |
| JP | 200700915 | | 1/2007 | |
| WO | 9510556 | A1 | 4/1995 | |

(Continued)

OTHER PUBLICATIONS

Machine Translation in English of JP 2006-083306 A, Tsuruta et al., Mar. 30, 2006.*
Dean J. M. et al reported in J. Polym. Sci., Part B: Polym. Phys. 39, 2996, 3010 (2001).
Taira, Kazunari, et al., Journal of the American Chemical Society, Jun. 8, 1984, 7831-7835, V. 106.
White S.R. et al in Nature 409, 794, 797 (2001).
Dow Global Technologies LLC U.S. Appl. No. 61/157,380, filed Mar. 9, 2009.
PCT/ US2011/050742, International Preliminary Report on Patentability mailed Apr. 11, 2013.
PCT/ US2011/050742, International Search Report and Written Opinion of the International Searching Authority mailed May 16, 2012.
PCT/ US2011/052236 International Preliminary Report on Patentability mailed Apr. 11, 2013.
PCT/US2011/049840, International Preliminary Report on Patentability issued Apr. 2, 2013.

(Continued)

*Primary Examiner* — David Karst
(74) *Attorney, Agent, or Firm* — Polsinelli PC

(57) ABSTRACT

An epoxy resin adduct including the reaction product of (A) at least one polyfunctional aliphatic or cycloaliphatic epoxy resin; and (B) at least one reactive compound; wherein the polyfunctional aliphatic or cycloaliphatic epoxy resin is isolated from the epoxy resin formed by the epoxidation of (i) an aliphatic or cycloaliphatic hydroxyl-containing material using (ii) an epi-halohydrin, (iii) a basic-acting substance, (iv) a non-Lewis acid catalyst, and (v) optionally one or more solvents; and wherein the re-active compound (B) comprises one or more compounds having two or more reactive hydrogen atoms per molecule and the reactive hydrogen atoms are reactive with epoxide groups. A curable epoxy resin composition includes the adduct described above. A cured epoxy resin is prepared by a process of curing the curable epoxy resin composition containing the adduct described above.

19 Claims, No Drawings

(56) References Cited

FOREIGN PATENT DOCUMENTS

| WO | 0001779 A1 | 1/2000 |
| WO | 03078512 A1 | 9/2003 |
| WO | 2007/078859 A2 | 7/2007 |
| WO | 2008045882 A1 | 4/2008 |
| WO | 2008045884 A1 | 4/2008 |
| WO | 2008045889 A1 | 4/2008 |
| WO | 2008045894 A1 | 4/2008 |
| WO | 2009/105938 A1 | 9/2009 |
| WO | 2009142898 A1 | 11/2009 |
| WO | 2009142900 A1 | 11/2009 |
| WO | 2009142901 A1 | 11/2009 |
| WO | 2012/044443 A1 | 4/2012 |
| WO | 2012/044455 A1 | 4/2012 |
| WO | 2012/050777 A1 | 4/2012 |
| WO | 2012044458 A1 | 4/2012 |

OTHER PUBLICATIONS

PCT/US2011/049840, International Search Report mailed May 5, 2012.
PCT/US2011/049840, Written Opinion of the International Searching Authority mailed May 11, 2012.
PCT/US2011/050597, International Preliminary Report on Patentability mailed Nov. 15, 2012.
PCT/US2011/050597, International Search Report mailed Jan. 3, 2012.
PCT/US2011/050597, Written Opinion of the International Searching Authority mailed Sep. 18, 2012.
PCT/US2011/050613, International Preliminary Report on Patentability mailed Jan. 1, 2013.
PCT/US2011/050613, International Search Report and Written Opinion mailed Jan. 5, 2012.
PCT/US2011/051291, International Preliminary Report on Patentability mailed Apr. 2, 2013.
PCT/US2011/051291, International Search Report mailed Dec. 2, 2011.
PCT/US2011/051291, Written Opinion of the International Searching Authority mailed Dec. 2, 2011.
PCT/US2011/051482, International Preliminary Report on Patentability mailed Apr. 11, 2013.
PCT/US2011/051482, International Search Report and Written Opinion of the International Searching Authority mailed Nov. 24, 2011.
PCT/US2011/052236 International Search Report and Written Opinion of the International Searching Authority mailed Dec. 6, 2011.
PCT/US2011/052672, International Preliminary Report on Patentability issued Apr. 2, 2013.
PCT/US2011/052672, International Search Report mailed Dec. 15, 2011.
PCT/US2011/052672, Written Opinion of the International Searching Authority mailed Dec. 15, 2011.

\* cited by examiner

EPOXY RESIN ADDUCTS AND THERMOSETS THEREOF

This application is a non-provisional application claiming priority from the U.S. Provisional Patent Application No. 61/388,067, filed on Sep. 30, 2010, entitled "EPDXY RESIN ADDUCTS AND THERMOSETS THEREFROM" the teachings of which are incorporated by reference herein, as if reproduced in full hereinbelow.

BACKGROUND OF THE INVENTION

1. Field of the Invention

The present invention relates to epoxy resin adducts and thermoset matrices prepared using such adducts.

2. Description of Background and Related Art

Conventional epoxy resin adducts and their preparations have been described in various references. For example, an adduct of diethylenetriamine and diglycidyl ether of bisphenol A is described by Henry Lee and Kris Neville in *Handbook of Epoxy Resins* published by McGraw Hill, Inc., New York, (1967) on pages 7-15 to 7-19. D.E.H.™ 52 (manufactured and marketed by The Dow Chemical Company) is a commercial adduct product of diethylenetriamine and diglycidyl ether of bisphenol A.

Daniel A. Scola in *Developments in Reinforced Plastics* 4 published by Elsevier Applied Science Publishers Ltd., England, pages 196-206 (1984) describes amine adducts of epoxy resins. The epoxy resin is selected from the diglycidyl ether of bisphenol A, tetraglycidyl 4,4'-diaminodiphenylmethane, triglycidyl p-aminophenol, epoxy phenol or cresol novalacs, hydrogenated diglycidyl ether of bisphenol A, or any combination thereof. The amine may be an aliphatic, cycloaliphatic, aromatic or alkylaromatic diamine.

J. Klee, et al. in *Crosslinked Epoxies* published by Walter de Gruyter and Co., Berlin, pages 47-54 (1987) describes the synthesis and analytical characterization of adducts of the diglycidyl ether of bisphenol A with primary monoamines including aniline, p-chloroaniline, benzylamine and cyclohexylamine.

Adducts of the epoxy resin of UNOXOL™ Diol (cis-, trans-1,3- and 1,4-cyclohexanedimethanol), curable blends and thermosets thereof are disclosed in WO2009142898 A1. However, heretofore the prior art has not disclosed an adduct formed by reacting an epoxy resin comprising a polyfunctional aliphatic or cycloaliphatic oligomeric product with a reactive compound comprising two or more reactive hydrogen atoms per molecule. There is also no disclosure in the prior art of preparing a curable epoxy resin composition comprising said adduct; or curing the curable epoxy resin composition to form a cured epoxy resin product.

SUMMARY OF THE INVENTION

The present invention is directed to an epoxy resin adduct which comprises the reaction product of a residual oligomeric product and a compound having two or more reactive hydrogen atoms per molecule such that the resulting adduct may be used as a curing agent with other thermosetting resins such as epoxy resin compounds.

A "residual oligomeric product" herein means an oligomeric fraction which is co-produced during an epoxidation process for producing an aliphatic or cycloaliphatic epoxy resin product; wherein the co-produced oligomeric fraction and the aliphatic or cycloaliphatic epoxy resin product resultant mixture after the epoxidation process is subjected to a subsequent separation process such that the co-produced oligomeric fraction is substantially separated and isolated from the aliphatic or cycloaliphatic epoxy resin product. The separation process can be carried out by a known means such as for example a distillation unit operation. Once the co-produced oligomeric fraction is separated from the aliphatic or cycloaliphatic epoxy resin product, for example by distillation, the resulting separated/isolated oligomeric fraction, typically the residual bottoms material of a distillation process, comprises the residual oligomeric product useful in the present invention.

One embodiment of the present invention is directed to an adduct comprising the reaction product of (A) the residual oligomeric product described above with (B) compounds comprising two or more reactive hydrogen atoms per molecule to produce adducts of the present invention. The residual oligomeric product further comprises a polyfunctional aliphatic or cycloaliphatic epoxy (PACE) resin which has been isolated from an epoxy resin product formed as a result of an epoxidation process. The epoxidation process comprises reacting (i) an aliphatic or cycloaliphatic hydroxyl-containing material; (ii) an epihalohydrin; (iii) a basic-acting substance; in the presence of (iv) a non-Lewis acid catalyst; and (v) optionally, one or more solvents.

In another embodiment, the resultant adduct of the present invention can be blended with one or more epoxy resins and, optionally, with an epoxy resin curing agent and/or a catalyst to form a curable epoxy resin composition. By curing of the curable epoxy resin composition, a cured epoxy resin thermoset can be obtained.

As aforementioned, one embodiment of the present invention includes an adduct comprising the reaction product of (A) at least one PACE resin; and (B) at least one reactive compound; wherein the reactive compound (B) comprises one or more compounds having two or more reactive hydrogen atoms per molecule and the reactive hydrogen atoms are reactive with epoxide groups.

Another embodiment includes an adduct of the present invention comprising a reaction product of (A) at least one PACE resin; (B) at least one reactive compound; and (C) at least one epoxy resin compound; wherein the reactive compound (B) comprises a compound having two or more reactive hydrogen atoms per molecule and the reactive hydrogen atoms are reactive with epoxide groups; and wherein the epoxy resin compound (C) comprises one or more epoxy resins other than the PACE resin component (A).

Still another embodiment of the present invention is directed to a process for preparing the above adducts.

Yet another embodiment of the present invention is directed to a curable epoxy resin composition comprising (I) at least one of the above adducts of the present invention; and (II) at least one thermosetting resin, such as at least one epoxy resin compound; for example, wherein the epoxy resin compound (II) may comprise one or more epoxy resins including, for example, a PACE resin component (A).

Another embodiment of the present invention is directed to a process of partially curing (B-staging) or completely curing the above curable epoxy resin compositions.

A further embodiment of the present invention is directed to a cured epoxy resin thermoset, and articles therefrom, prepared by the above process of curing the above curable epoxy resin compositions.

DETAILED DESCRIPTION OF THE INVENTION

One broad embodiment of the present invention is an adduct comprising the reaction product of (A) at least one oligomeric polyfunctional aliphatic or cycloaliphatic epoxy resin; and (B) at least one reactive compound having two or more reactive hydrogen atoms per molecule and the reactive hydrogen atoms are reactive with epoxide groups.

The term "polyfunctional aliphatic or cycloaliphatic epoxy resin (PACE resin)", also referred to herein interchangeably as an "oligomeric product or co-product" or a "second oligomeric epoxy resin product or co-product", or simply "oligomer", is used herein to mean a product isolated and separated from a first epoxy resin product; wherein the first epoxy resin product and second oligomeric epoxy resin product or co-product are formed as a result of an epoxidation reaction of (i) an aliphatic or cycloaliphatic hydroxyl containing material, (ii) an epihalohydrin, (iii) a basic-acting substance, (iv) a non-Lewis acid catalyst; and optionally, (v) one or more solvents.

The isolated oligomeric product comprises the product remaining after substantial removal of: (1) "light" components, such as, for example, solvents used in the epoxidation reaction, if any, unreacted epihalohydrin, and co-products such as di(epoxypropyl)ether; (2) unreacted aliphatic or cycloaliphatic hydroxyl containing material, if any; (3) partially epoxidized aliphatic or cycloaliphatic hydroxyl containing material, such as, for example, monoglycidyl ether; and (4) fully epoxidized aliphatic or cycloaliphatic hydroxyl containing material, such as, for example, diglycidyl ether, such that the PACE resin product remaining contains no more than 20 percent by weight (wt %) of said fully epoxidized aliphatic or cycloaliphatic hydroxyl containing material (4).

As used herein, the term "adduct" means a product of a direct addition of two or more distinct molecules, resulting in a single reaction product. The resultant reaction product or adduct is considered a distinct molecular species from the reactants used to form the adduct.

In general, the PACE resin component (A) used as a reactant in the present invention is prepared by a process (e.g. an epoxidation reaction) comprising reacting (i) an aliphatic or cycloaliphatic hydroxyl-containing material with (ii) an epihalohydrin, and (iii) a basic acting substance in the presence of (iv) a non-Lewis acid catalyst. The process may optionally comprise (v) one or more solvents which are substantially inert to reaction with the reactants employed, the intermediates formed and the epoxy resin product produced. Said process typically comprises the steps of (1) coupling of the epihalohydrin with the aliphatic or cycloaliphatic hydroxyl-containing material and (2) dehydrohalogenation of the intermediate halohydrin thus formed. The process may be, for example, a phase transfer catalyzed epoxidation process, a slurry epoxidation process, or an anhydrous epoxidation process.

A detailed description of the PACE resin (A) useful in the present invention and the processes for preparing the such resin is provided in co-pending U.S. Patent Application Ser. No. 61/388,059, entitled "THERMOSETTABLE COMPOSITIONS AND THERMOSETS THEREFROM", filed of even date herewith by Robert Hefner, Jr. and co-pending U.S. Patent Application Ser. No. 61/388,064, entitled "EPDXY RESIN COMPOSITIONS", filed of even date herewith by Robert E. Hefner, Jr., both incorporated herein by reference.

Generally, the PACE resin of the present invention is produced as a second product stream during the production of a first epoxy resin product stream by epoxidizing an aliphatic or cycloaliphatic hydroxyl containing material, particularly an aliphatic or cycloaliphatic diol such as described in WO2009/142901, incorporated herein by reference. After the epoxidation reaction, the PACE resin composition (second epoxy resin product stream) is separated and isolated from the first epoxy resin product stream.

The first and second epoxy resin products are formed by epoxidizing (i) an aliphatic or cycloaliphatic hydroxyl containing material with (ii) an epihalohydrin, (iii) a basic-acting substance, in the presence of (iv) a non-Lewis acid catalyst, and (v) optionally, one or more solvents.

Aliphatic or cycloaliphatic hydroxyl-containing materials which may be employed in the epoxidation process of the present invention may include for example any one or more of the following: (a) cyclohexanedialkanols and cyclohexenedialkanols such as UNOXOL™ Diol (cis-, trans-1,3- and 1,4-cyclohexanedimethanol) as a preferred cyclohexanedialkanol; (b) cyclohexanolmonoalkanols and cyclohexenolmonoalkanols, such as trans-2-(hydroxymethyl)cyclohexanol or 1-phenyl-cis-2-hydroxymethyl-r-1-cyclohexanol; (c) decahydronaphthalenedialkanols, octahydronaphthalenedialkanols and 1,2,3,4-tetrahydronaphthalenedialkanols, such as 1,2-decahydronaphthalenedimethanol; (d) bicyclohexanedialkanols or bicyclohexanolmonoalkanols, such as bicyclohexane-4,4'-dimethanol; (e) bridged cyclohexanols, such as hydrogenated bisphenol A (4,4'-isopropylidenediphenol); (f) other cycloaliphatic and polycycloaliphatic diols, monol monoalkanols, or dialkanols such as, cyclopentane-1,3-diol; or (g) aliphatic hydroxyl-containing materials such as alkoxylated phenolic reactants; as described in pages 9 to 15 of co-pending U.S. Patent Application Ser. No. 61/388,059, such pages incorporated herein by reference.

The epichlorohydrin, component (ii); the basic acting substance, component (iii); the non-Lewis acid catalyst, component (iv); and the optional solvent, component (v) useful in the present invention may be selected from the same components as described in pages 15 to 18 of co-pending U.S. Patent Application Ser. No. 61/388,059, such pages incorporated herein by reference.

One embodiment of the PACE resin, useful as component (A) in the present invention, may include the polyfunctional oligomeric aliphatic/cycloaliphatic epoxy resin isolated from the epoxy resin of cis-, trans-1,3- and 1,4-cyclohexanedimethanol. It is to be understood that the PACE resin comprises multiple components. For example, for the PACE resin isolated from the epoxy resin of cis-, trans-1,3- and 1,4-cyclohexanedimethanol, the following components have been identified and may or may not be present in the individual products depending on the chemistry and processing employed to produce said epoxy resin (geometrical isomers and substitution are not shown in the chemical structures, the multiple geometrical isomers that are present are not given by the chemical names, other unidentified components may be present):

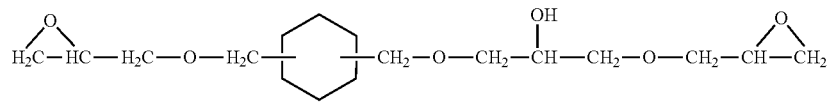

2-propanol, 1-(oxiranylmethoxy)-3-[[3(or 4)-[(oxiranylmethoxy)methyl]cyclohexyl]methoxy]-

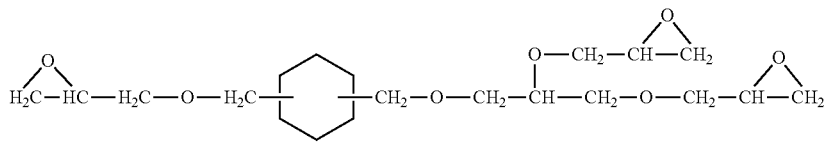

oxirane, 2-[[[3(or 4)-4-[[2,3-bis(oxiranylmethoxy)

propoxy]methyl]cyclohexyl]methoxy]methyl]-

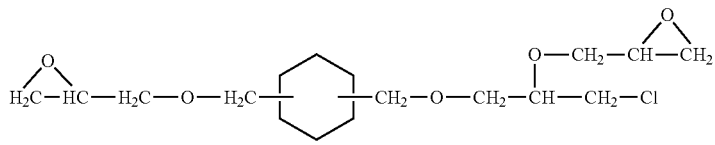

oxirane, 2-[[2-chloro-1-[[[3(or 4)-[(oxiranylmethoxy)methyl]cyclohexyl]methoxy]methyl]

ethoxy]methyl]-

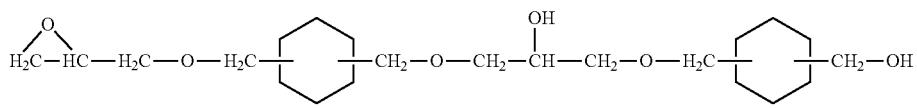

cyclohexanemethanol, 3(or 4)-[[2-hydroxy-3-[[3(or

4)-[(oxiranylmethoxy)methyl]cyclohexyl]methoxy]

propoxy]methyl]-

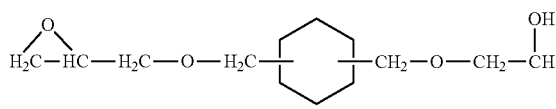

2-propanol, 1,3-bis[[3(or

4)-[(oxiranylmethoxy)methyl]cyclohexyl]methoxy]-

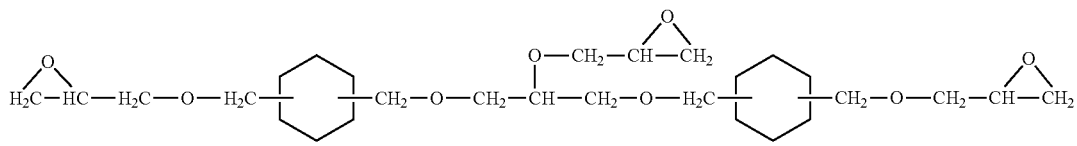

oxirane, 2-[[2-[[3(or 4)-[(oxiranylmethoxy)methyl]
cyclohexyl]methoxy]-1-[[[3(or 4)-[(oxiranyl-
methoxy)methyl]cyclohexyl]methoxy]methyl]
ethoxy]methyl]-

A minor amount of 3 isomeric monochloro compounds co-elute with this latter triglycidyl ether.

A further embodiment of the PACE resin, useful as component (A) in the present invention, may include a re-epoxidized oligomeric polyfunctional aliphatic or cycloaliphatic epoxy resin. For example, the re-epoxidized PACE resin compositions and the re-epoxidation process for producing said compositions are disclosed in aforementioned co-pending U.S. Patent Application Ser. No. 61/388,064. The re-epoxidation process is conducted to modify the distribution of the components comprising said epoxy resin.

The reactive compound (B) used in the present invention to react with the PACE resin to form the adduct comprises at least one compound having two or more reactive hydrogen atoms per molecule. The reactive hydrogen atoms are reactive with epoxide groups, such as those epoxide groups contained in the PACE resin. The term "reactive hydrogen atom" as used herein means that the hydrogen atom is reactive with an epoxide group. The reactive hydrogen atom differs from other hydrogen atoms including those hydrogen atoms which are non-reactive with epoxide groups in the reaction of forming the adduct but may be reactive with epoxide groups in a later process of curing the adduct with one or more epoxy resins.

Hydrogen atoms can be non-reactive with the epoxide groups in the process of forming the adduct but reactive in a later process of curing the adduct with the epoxy resin, when there are other functional groups, which are much more reactive with the epoxide groups under reaction conditions used, present in the reaction of forming the adduct. For example, a reactive compound (B) may have two different functional groups each bearing at least one reactive hydrogen atom, with one functional group being inherently more reactive with an epoxide group than the other under the reaction conditions used. These reaction conditions may include the use of a catalyst which favors a reaction of the reactive hydrogen atom(s) of one functional group with an epoxide group over a reaction of the reactive hydrogen atom(s) of the other functional group with an epoxide group.

Other non-reactive hydrogen atoms may also include hydrogen atoms in the secondary hydroxyl groups which form during an epoxide ring opening reaction in the process of producing the adduct.

The reactive compound (B) comprising at least one compound having two or more reactive hydrogen atoms per molecule may further comprise aliphatic, cycloaliphatic or aromatic groups within the reactive compound (B) structure. The aliphatic groups may be branched or unbranched. The aliphatic or cycloaliphatic groups may also be saturated or unsaturated and may comprise one or more substituents which are inert (not reactive) to the process of preparing the adduct of the present invention including the reactants and the products. The substituents may be attached to a terminal carbon atom or may be between two carbon atoms, depending on the chemical structures of the substituents. Examples of such inert substituents include halogen atoms, preferably chlorine or bromine, nitrile, nitro, alkyloxy, keto, ether (—O—), thioether (—S—), or tertiary amine. The aromatic ring, if present within the reactive compound (B) structure, may comprise one or more heteroatoms such as N, O, S and the like.

Examples of the reactive compound (B) may include compounds such as (a) di- and polyphenols, (b) di- and polycarboxylic acids, (c) di- and polymercaptans, (d) di- and polyamines, (e) primary monoamines, (f) sulfonamides, (g) aminophenols, (h) aminocarboxylic acids, (i) phenolic hydroxyl containing carboxylic acids, (j) sulfanilamides, and (k) any combination of any two or more of such compounds or the like.

Examples of the di- and polyphenols (a) include 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,1'-bis(4-hydroxyphenyl)-1-phenylethane; 3,3',5,5'-tetrachlorobisphenol A; 3,3'-dimethoxybisphenol A; 3,3',5,5'-tetramethyl-4,4'-dihydroxydiphenyl; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; 1,1-bis(4-hydroxyphenyl) cyclohexane; 1,4-dihydroxy-3,6-dimethylbenzene; 1,4-dihydroxy-3,6-dimethoxybenzene; 1,4-dihydroxy-2-tert-butylbenzene; 1,4-dihydroxy-2-bromo-5-methylbenzene; 1,3-dihydroxy-4-nitrophenol; 1,3-dihydroxy-4-cyanophenol; tris(hydroxyphenyl)methane; dicyclopentadiene or an oligomer thereof and phenol or substituted phenol condensation products; and any mixture thereof.

Examples of the di- and polycarboxylic acids (b) include terephthalic acid, isophthalic acid, dicyclopentadienedicarboxylic acid, tris(carboxyphenyl)methane; 4,4'-dicarboxydiphenylmethane; 1,4-cyclohexanedicarboxylic acid; 1,6-hexanedicarboxylic acid; 1,4-butanedicarboxylic acid; 1,1-bis(4-carboxyphenyl)cyclohexane; 3,3',5,5'-tetramethyl-4,4'-dicarboxydiphenyl; 4,4'-dicarboxy-alpha-methylstilbene; 1,4-bis(4-carboxyphenyl)-trans-cyclohexane; 1,1'-bis(4-carboxyphenyl)cyclohexane; 1,3-dicarboxy-4-methylbenzene; 1,3-dicarboxy-4-methoxybenzene; 1,3-dicarboxy-4-bromobenzene; and any combination thereof.

Examples of the di- and polymercaptans (c) include bis(2-mercaptoethyl)sulfide, tris(mercaptophenyl)methane, 1,3-benzenedithiol; 1,4-benzenedithiol; 4,4'-dimercaptodiphenylmethane; 4,4'-dimercaptodiphenyl oxide; 4,4'-dimercapto-alpha-methylstilbene; 3,3',5,5'-tetramethyl-4,4'-dimercaptodiphenyl; 1,4-cyclohexanedithiol; 1,6-hexanedithiol; 2,2'-dimercaptodiethylether; 1,2-dimercaptopropane; 1,1-bis(4-mercaptophenyl) cyclohexane, and any combination thereof.

Examples of the di- and polyamines (d) include tris(aminophenyl)methane, bis(aminomethyl)norbornane, piperazine, ethylenediamine, diethyletriamine, triethylenetetramine, tetraethylenepentamine, 1-(2-aminoethyl)piperazine, bis(aminopropyl)ether, bis(aminopropyl)sulfide, isophorone diamine, 1,2-diaminobenzene; 1,3-diaminobenzene; 1,4-diaminobenzene; 4,4'-diaminodiphenylmethane; 4,4'-diaminodiphenylsulfone; 2,2'-diaminodiphenylsulfone; 4,4'-diaminodiphenyl oxide; 3,3',5,5'-tetramethyl-4,4'-diaminodiphenyl; 3,3'-dimethyl-4,4'-diaminodiphenyl; 4,4'-diamino-alpha-methylstilbene; 4,4'-diaminobenzanilide; 4,4'-diaminostilbene; 1,4-bis(4-aminophenyl)-trans-cyclohexane; 1,1-bis(4-aminophenyl)cyclohexane; 1,2-cyclohexanediamine; 1,4-bis(aminocyclohexyl)methane; 1,3-bis (aminomethyl)cyclohexane; 1,4-bis(aminomethyl) cyclohexane; 1,4-cyclohexanediamine; 1,6-hexanediamine, 1,3-xylenediamine; 2,2'-bis(4-aminocyclohexyl)propane; 4-(2-aminopropan-2-yl)-1-methylcyclohexan-1-amine (menthane diamine); and any combination thereof.

Examples of the primary monoamines (e) include aniline, 4-chloroaniline, 4-methylaniline, 4-methoxyaniline, 4-cyanoaniline, 4-aminodiphenyl oxide, 4-aminodiphenylmethane, 4-aminodiphenylsulfide, 4-aminobenzophenone, 4-amino-diphenyl, 4-aminostilbene, 4-amino-alpha-methylstilbene, methylamine, 4-amino-4'-nitrostilbene, n-hexylamine, cyclohexylamine, aminonorbornane, N,N-diethyltrimethylenediamine; 2,6-dimethylaniline; and any combination thereof. When ammonia is used as the reactive compound (B) of the present invention, the ammonia may be used in the form of liquified ammonia ($NH_3$) or ammonium hydroxide ($NH_4OH$).

Examples of the sulfonamides (f) include phenylsulfonamide, 4-methoxyphenylsulfonamide, 4-chlorophenylsulfonamide, 4-bromophenylsulfonamide, 4-methylsulfonamide, 4-cyanosulfonamide, 4-sulfonamidodiphenyl oxide, 4-sulfonamidodiphenylmethane, 4-sulfonamidobenzophenone, 4-sulfonylamidodiphenyl, 4-sulfonamidostilbene, 4-sulfonamido-alpha-methylstilbene, 2,6-dimethyphenylsulfonamide; and any combination thereof.

Examples of the aminophenols (g) include o-aminophenol, m-aminophenol, p-aminophenol, 2-methoxy-4-hydroxyaniline, 3-cyclohexyl-4-hydroxyaniline, 2,6-dibromo-4-hydroxyaniline, 5-butyl-4-hydroxyaniline, 3-phenyl-4-hydroxyaniline, 4-(1-(3-aminophenyl)-1-methylethyl)phenol, 4-(1-(4-aminophenyl)ethyl)phenol, 4-(4-aminophenoxy) phenol, 4-((4-aminophenyl)thio)phenol, (4-aminophenyl)(4-hydroxyphenyl)methanone, 4-((4-aminophenyl)sulfonyl) phenol, N-methyl-p-aminophenol, 4-amino-4'-hydroxy-alpha-methylstilbene, 4-hydroxy-4'-amino-alpha-methylstilbene, 3,5-dimethyl-4-hydroxyaniline; 4-(1-(4- amino-3,5-dibromophenyl-1-methylethyl)-2,6-dibromophenol; and any combination thereof.

Examples of the aminocarboxylic acids (h) include 2-aminobenzoic acid, 3-aminobenzoic acid, 4-aminobenzoic acid, 2-methoxy-4-aminobenzoic acid, 3-cyclohexyl-4-aminobenzoic acid, 5-butyl-4-aminobenzoic acid, 3-phenyl-4-aminobenzoic acid, 4-(1-(3-aminophenyl)-1-methylethyl)benzoic acid, 4-(1-(4-aminophenyl)ethyl)benzoic acid, 4-(4-aminophenoxy)benzoic acid, 4-((4-aminophenyl)thio)benzoic acid, (4-aminophenyl)(4-carboxyphenyl)methanone, 4-((4-aminophenyl)sulfonyl)benzoic acid, N-methyl-4-aminobenzoic acid, 4-amino-4'-carboxy-alpha-methylstilbene, 4-carboxy-4'-amino-alpha-methylstilbene, glycine, N-methylglycine, 4-aminocyclohexanecarboxylic acid, 4-aminohexanoic acid, 4-piperidinecarboxylic acid, 5-aminophthalic acid, 3,5-dimethyl-4-aminobenzoic acid; 2,6-dibromo-4-aminobenzoic acid; 4-(1-(4-amino-3,5-dibromophenyl-1-methylethyl)-2,6-dibromobenzoic acid; and any combination thereof.

Examples of the carboxylic acids (i) include 2-hydroxybenzoic acid, 3-hydroxybenzoic acid, 4-hydroxybenzoic acid, 2-methoxy-4-hydroxybenzoic acid, 3-cyclohexyl-4-hydroxybenzoic acid, 5-butyl-4-hydroxybenzoic acid, 3-phenyl-4-hydroxybenzoic acid, 4-(1-(3-hydroxyphenyl-1-methylethyl)benzoic acid, 4-(1-(4-hydroxyphenyl)ethyl)benzoic acid, 4-(4-hydroxyphenoxy)benzoic acid, 4-((4-hydroxyphenyl)thio)benzoic acid, (4-hydroxyphenyl)(4-carboxyphenyl)methanone, 4-((4-hydroxyphenyl)sulfonyl)benzoic acid, 4-hydroxy-4'-carboxy-alpha-methylstilbene, 4-carboxy-4'-hydroxy-alpha-methylstilbene, 2-hydroxyphenylacetic acid, 3-hydroxyphenylacetic acid, 4-hydroxyphenylacetic acid, 4-hydroxyphenyl-2-cyclo-hexanecarboxylic acid, 4-hydroxyphenoxy-2-propanoic acid, 4-(1-(4-hydroxy-3,5-dibromophenyl-1-methylethyl)-2,6-dibromobenzoic acid; 3,5-dimethyl-4-hydroxybenzoic acid; 2,6-dibromo-4-hydroxybenzoic acid; and any combination thereof.

Examples of the sulfanilamides (j) include o-sulfanilamide, m-sulfanilamide, p-sulfanilamide, 2-methoxy-4-aminobenzoic acid, 3-methyl-4-sulfonamido-1-aminobenzene, 5-methyl-3-sulfonamido-1-aminobenzene, 3-phenyl-4-sulfonamido-1-aminobenzene, 4-(1-(3-sulfonamidophenyl-1-methyl-ethyl)aniline, 4-(1-(4-sulfonamidophenyl)ethyl)aniline, 4-(4-sulfonamidophenoxy)aniline, 4-((4-sulfonamidophenyl)thio)aniline, (4-sulfonamidophenyl)(4-aminophenyl)methanone, 4-((4-sulfonamidophenyl)sulfonyl)aniline, 4-sulfonamido-1-N-methylaminobenzene, 4-amino-4'-sulfonamido-alpha-methylstilbene, 4-sulfonamido-4'-amino-alpha-methylstilbene, 4-(1-(4-sulfonamido-3,5-dibromophenyl)-1-methylethyl)-2,6-dibromo-aniline; 2,6-dimethyl-4-sulfonamido-1-aminobenzene; and any combination thereof.

Another embodiment of the present invention is an adduct comprising the reaction product of (A) the PACE resin described above; (B) the reactive compound described above; and (C) an epoxy resin compound; wherein the epoxy resin compound (C) comprises one or more epoxy resins other than the PACE resin, component (A).

The epoxy resin which can be used as the epoxy resin compound (C) other than the PACE resin may be any epoxide-containing compound which has an average of more than one epoxide group per molecule. The epoxy resin (including advanced epoxy resins) which can be used as the epoxy resin compound (C) herein include those epoxy resins described in pages 24 to 26 of co-pending U.S. Patent Application Ser. No. 61/388,059, such pages incorporated herein by reference.

The adduct of the present invention is a reaction product of the PACE resin, component (A), a reactive compound, component (B) and, optionally, component (C), an epoxy resin compound comprising one or more epoxy resins other than the PACE resin.

According to the present invention, a sufficient amount of the PACE resin (A) and the epoxy resin compound (C), if used, and an excess amount of the reactive compound (B) are provided in a reaction mixture to form the adduct of the present invention. At the end of the reaction for forming the adduct of the present invention, essentially all of the epoxide groups in the PACE resin (A) are reacted with reactive hydrogen atoms in the reactive compound (B). The unreacted reactive compound (B) may be removed at the end of the reaction or may remain as a part of the adduct product.

In general, the ratio of the reactive compound (B) and the PACE resin (A) is from about 2:1 to about 100:1, preferably from about 3:1 to about 60:1, and more preferably from about 4:1 to about 40:1 equivalents of the reactive hydrogen atom in the reactive compound (B) per equivalent of epoxide group in the PACE resin (A) and epoxy resin compound (C), if used.

An optional catalyst, component (D), may be employed to prepare the adduct of the present invention. Examples of the catalyst include phosphines, quaternary ammonium compounds, phosphonium compounds, sulfonium compounds, tertiary amines, and any mixture thereof.

The amount of catalyst (D) used, if any, depends upon the particular reactants used for preparing the adduct and the type of catalyst employed. In general, the catalyst may be used in an amount of from about 0.01 wt % to about 1.5 wt %, and preferably from about 0.03 wt % to about 0.75 wt %, based on the total weight of the adduct.

One or more optional solvents may be present in the adduct forming reaction of the present invention. The presence of a solvent or solvents, component (E), can improve the solubility of the reactants or, if the reactant is in a solid form, dissolve the solid reactant for easy mixing with other reactants. The presence of the solvent may also dilute the concentration of the reactants in order to moderate the adduct forming reaction such as to control heat generated from the adduct forming reaction or to lower the effective concentration of a reactant which can in turn influence the structure of the adduct product, for example, produce an adduct with less oligomeric component derived from the adduct forming reaction.

The solvent may be any solvent which is substantially inert to the adduct forming reaction including inert to the reactants, the intermediate products if any, and the final products. Examples of suitable solvents useful in the present invention include aliphatic, cycloaliphatic and aromatic hydrocarbons, halogenated aliphatic and cycloaliphatic hydrocarbons, aliphatic and cycloaliphatic secondary alcohols, aliphatic ethers, aliphatic nitriles, cyclic ethers, glycol ethers, esters, ketones, amides, sulfoxides, and any combination thereof.

Preferred examples of the solvents include pentane, hexane, octane, cyclohexane, methylcyclohexane, toluene, xylene, methylethylketone, methylisobutylketone, cyclohexanone, dimethylsulfoxide, diethyl ether, tetrahydrofuran, 1,4-dioxane, dichloromethane, chloroform, ethylene dichloride, methyl chloroform, ethylene glycol dimethyl ether, acetonitrile, isopropanol, N,N-dimethylacetamide; N,N-dimethylformamide and any combination thereof.

The solvent may be removed at the completion of the adduct reaction using conventional means, such as, for example, vacuum distillation. Alternatively, the solvent may also be left in the adduct product to provide a solvent borne adduct which may be used later, for example, in the preparation of a coating or film.

The adduct forming reaction conditions may vary depending upon factors such as types and amounts of reactants employed, type and amount of catalyst used, if any, type and amount of solvent used, if any, and modes of addition of the reactants employed.

For example, the adduct forming reaction may be conducted at atmospheric (e.g. 760 mm Hg), superatmospheric or subatmospheric pressures and at temperature of from about 0° C. to about 260° C., and preferably from about 20° C. to about 200° C., and more preferably from about 35° C. to about 160° C.

The time required to complete the adduct forming reaction depends not only upon the aforementioned factors, but also upon the temperature employed. Higher temperature requires a shorter period of time, whereas lower temperature requires a longer period of time. In general, the time to complete the adduct reaction is preferred to be from about 5 minutes to about one week, more preferably from about 30 minutes to about 72 hours, and most preferably from about 60 minutes to 48 hours.

The time and temperature may have significant impact on the distribution of components in the formation of the adduct of the present invention. For example, with higher reaction temperature, longer reaction time, and when the reactive compound (B) comprises a material having only two reactive hydrogen atoms per molecule, the reaction favors the formation of the adduct with more oligomeric components derived from the adduct forming reaction. The reaction favors the formation of the adduct with more branched or crosslinked components when the reactive compound (B) comprises a material having more than two reactive hydrogen atoms per molecule.

In carrying out the adduct forming reaction, the PACE resin (A) may be directly mixed together with the reactive compound (B), added to the reactive compound (B) in incremental steps, or added to the reactive compound (B) continuously. In addition, one or more solvents may be first added to the PACE resin (A) and/or the reactive compound (B) before mixing the PACE resin (A) and the reactive compound (B).

If incremental addition of the PACE resin (A) is used, all or a part of an added increment may be allowed to react prior to addition of the next increment. The incremental addition of the PACE resin (A) reacted within an excess amount of the reactive compound (B) generally favors the formation of the adduct with a lesser amount or free of oligomeric components derived from the adduct forming reaction.

Various post treatments may be applied to the process of preparing the adduct of the present invention in order to modify: (1) the distribution of components of the adduct [e.g. distribution of the amount of the components present in the adduct formed from the PACE resin (A)], (2) the reactivity of the adduct, and/or (3) the physical properties of the adduct.

For example, for an adduct prepared from the PACE resin (A) and cyclohexylamine (B), when a large stoichiometric excess amount of the primary amine groups derived from the cyclohexylamine is used to react with the epoxide groups derived from the PACE resin, the reaction may lead to the formation of an adduct with a low content of oligomeric component derived from the adduct forming reaction. The resultant adduct product may also comprise, as a part of the adduct product, a high concentration of cyclohexylamine as the unreacted reactive compound (B). Accordingly, post treatment of the adduct product, such as vacuum distillation, may be employed to strip out the unreacted reactive compound (B).

Other post treatment methods used to modify the distribution of the adduct components may also be employed, such as, for example, recrystallization, chromatographic separation, extraction, zone refining, crystal refining, falling film distillation, wiped film distillation, vacuum distillation, preferential chemical derivatization and removal of one or more components of the adduct, and any combination thereof.

According to the present invention, the reaction of the PACE resin (A) and the reactive compound (B) to form the adduct of the present invention involves a ring opening reaction. During the ring opening reaction, the epoxide groups in the PACE resin (A) react with the reactive hydrogen atoms in the reactive compound (B) to give characteristic 2-hydroxylpropyl functionalities as linkages between residual structures of the PACE resin (A) and residual structures of the reactive compound (B).

An example of the adduct of the present invention may be a reaction product of PACE resin (A) isolated from the epoxy resin of cis-, trans-1,3- and 1,4-cyclohexanedimethanol and cyclohexylamine (B). For this example, only the major components of the PACE resin (A) are shown, where the multiple geometrical isomers that are present are not given by the chemical names that is, oxirane, 2-[[[3(or 4)-[[2,3-bis(oxiranylmethoxy)propoxy]methyl]cyclohexyl]methoxy]methyl]-; 2-propanol, 1,3-bis[[3(or 4)-[(oxiranylmethoxy)methyl]cyclohexyl]methoxy]-; and oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]-;

The following adduct structure shows the 2-hydroxylpropyl functionality as the linkage between the residual structure of the PACE resin (A) and the residual structure of the reactive compound (B) (geometrical isomers and substitution are not shown):

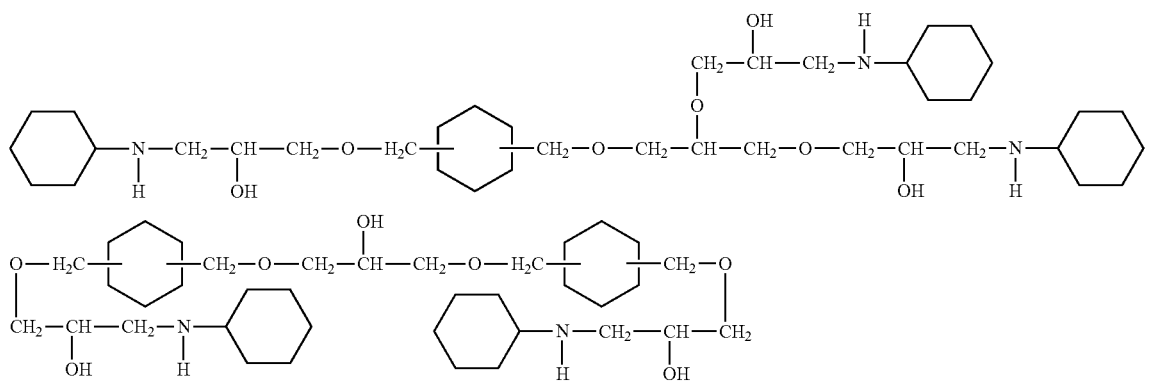

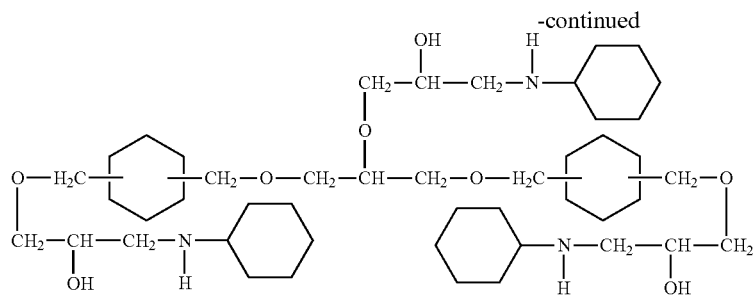

The reactive compound (B) may selected from the compounds having dual functional groups, such as (f) sulfonamides, (g) aminophenols, (h) aminocarboxylic acids, (i) phenolic hydroxyl containing carboxylic acids, and (j) sulfanilamides. These compounds may be utilized to provide an adduct with different functional groups of different reactivity for curing an epoxy resin. An example of this type of adduct is a reaction product of an aminophenol compound, p-N-methylaminomethylphenol (B), and the PACE resin (A) isolated from the epoxy resin of cis-, trans-1,3- and 1,4-cyclohexanedimethanol. The reaction provides the adduct with phenolic hydroxyl terminated groups when the reaction is under mild conditions including, for example, (a) with no catalyst, (b) at low temperature (e.g. about 25° C. to about 50° C.), (c) for a relatively long reaction time, (d) using incremental or slow continuous addition of the PACE resin (A) to a large stoichiometric excess of the reactive compound (B), and (e) both the PACE resin (A) and the reactive compound (B) are in solvent.

The following adduct structure shows the adduct comprising phenolic hydroxyl terminated groups (geometrical isomers and substitution are not shown, only the major components of the PACE resin (A) are shown, as described above):

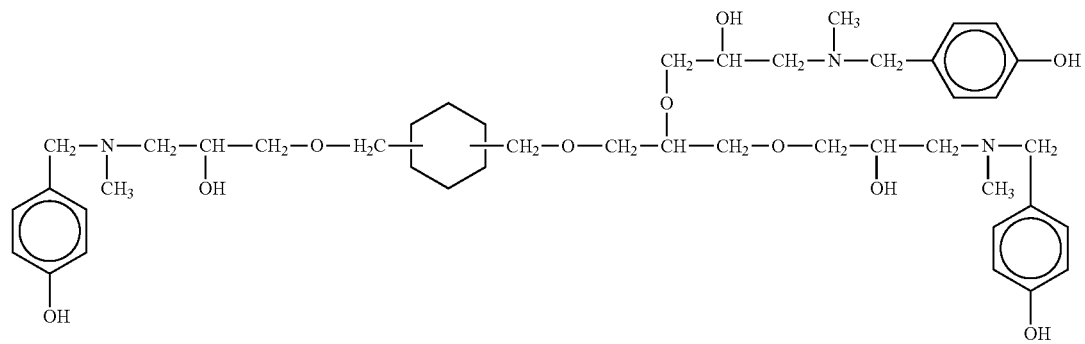

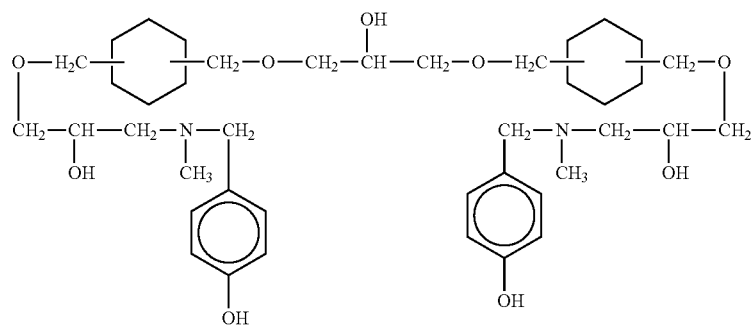

-continued

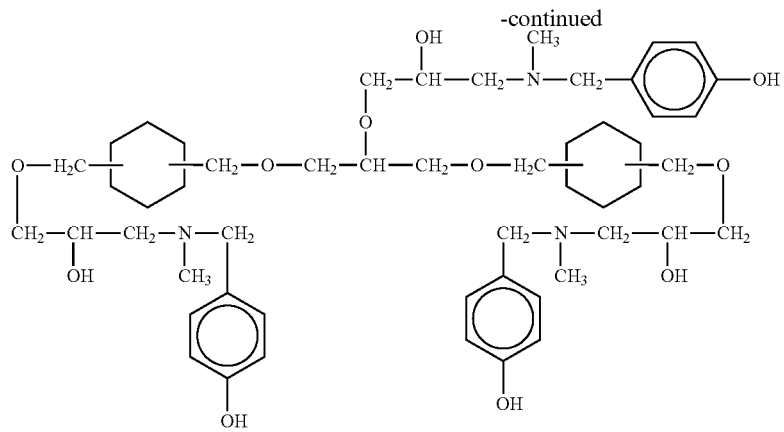

A reaction using catalysis favoring one functional group over another with the epoxide group may also be employed. For example, when a reactive compound (B) comprising at least two different functional groups each bearing at least one reactive hydrogen atom is used to form the adduct of the present invention, a catalyst which favors a reaction of reactive hydrogen atom(s) of one type of functional group with an epoxide group over a reaction of reactive hydrogen atom(s) of the other type of functional group with an epoxide group may be employed.

The adduct may also comprise at least one oligomeric component formed via a reaction of epoxide groups from at least two separate epoxy resin containing molecules with each respective epoxy resin having one of the epoxide groups already reacted with the reactive hydrogen atoms in the reactive compound (B).

An example of this type of adduct is a reaction product of the PACE resin (A) isolated from the epoxy resin of cis-, trans-1,3- and 1,4-cyclohexanedimethanol and cyclohexylamine (B). The following adduct structure shows that the oligomeric component from the adduct forming reaction is derived from at least two epoxide groups from two separate PACE resins each with one of the epoxide groups already reacted with cyclohexylamine (geometrical isomers and substitution are not shown, only the major components of the PACE resin (A) are shown, as described above):

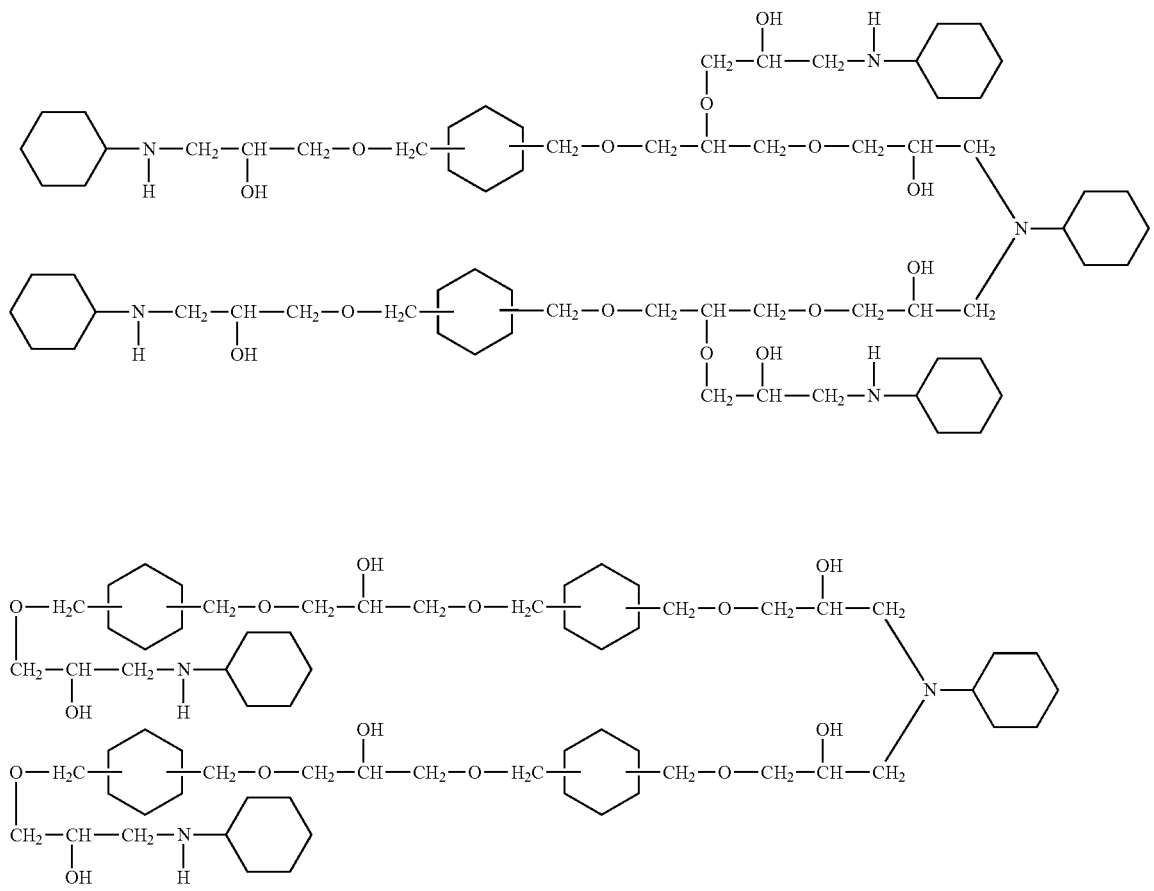

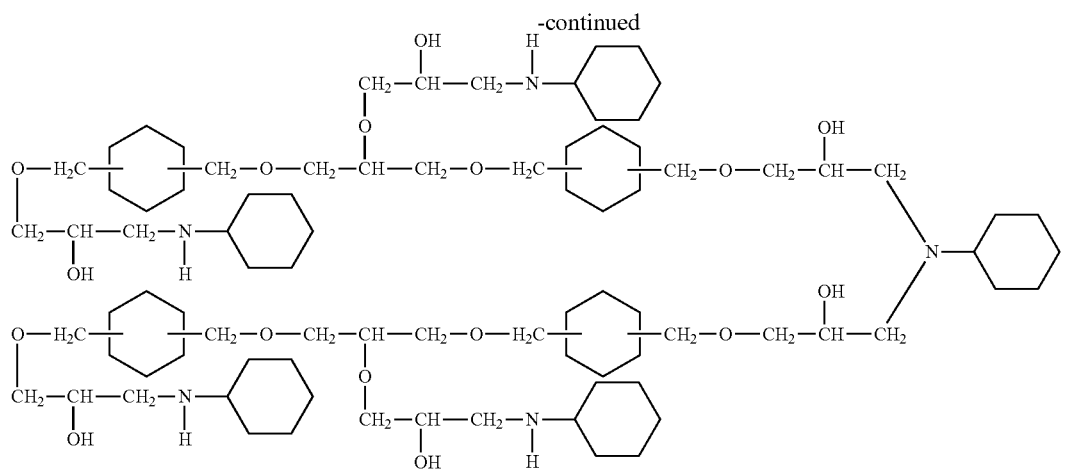

The adduct may also comprise at least one branched or crosslinked adduct structure derived from any one of the following reactions:

(1) a reaction between an epoxide group from an epoxy resin containing molecule which has already been adducted at another epoxide group of the epoxy resin and a hydroxyl group of a 2-hydroxypropyl linkage from an adduct of the present invention; or (2) a reaction between three separate epoxy resin containing molecules with three reactive hydrogen atoms from the reactive compound (B) of the present invention.

An example of the above reaction (1) is a reaction of a hydroxyl group from an adduct of the reaction product of the PACE resin (A) isolated from the epoxy resin of cis-, trans-1,3- and 1,4-cyclohexanedimethanol and cyclohexylamine (B) with a reaction product of the PACE resin (A) isolated from the epoxy resin of cis-, trans-1,3- and 1,4-cyclohexanedimethanol which has already been adducted with cyclohexylamine (B) at one of the epoxide groups. The chemical structure of the resultant reaction product is shown as follows (geometrical isomers and substitution are not shown, only the major components of the PACE resin (A) are shown, as described above):

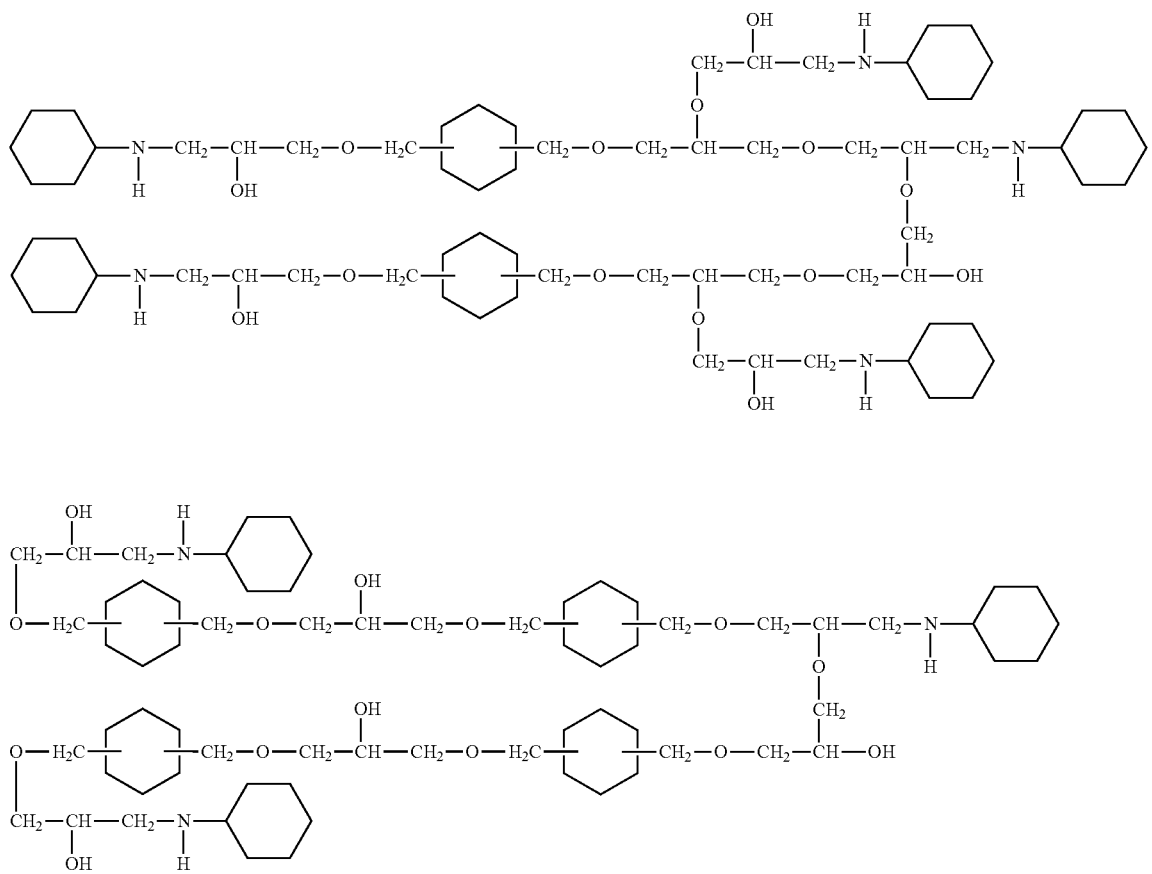

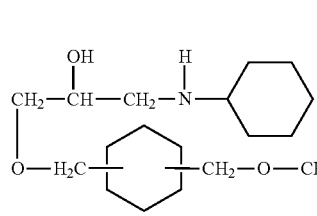
-continued
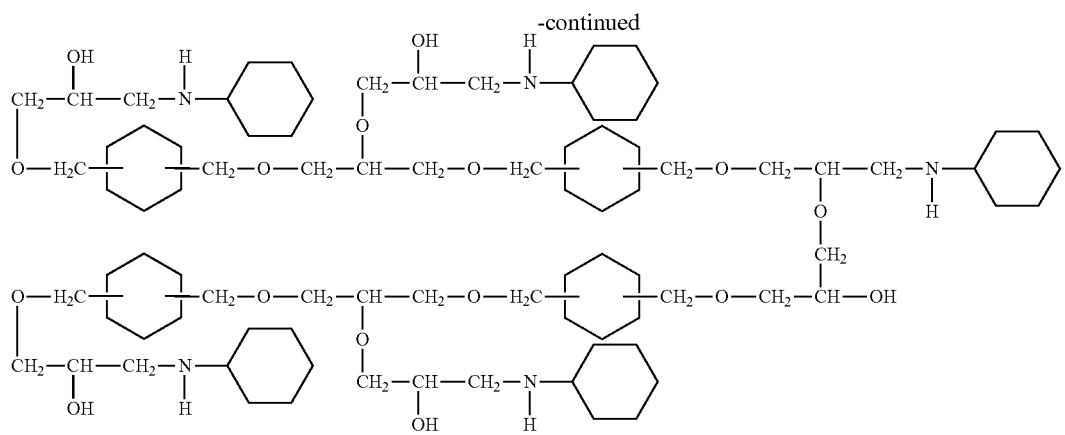

An example of the above reaction (2) is a reaction of an amino hydrogen of the adduct of diethylenetriamine and the PACE resin (A) isolated from the epoxy resin of cis-, trans-1,3- and 1,4-cyclohexanedimethanol wherein an epoxide group from a second PACE resin (A) isolated from the epoxy resin of cis-, trans-1,3- and 1,4-cyclohexanedimethanol has already reacted with another amino hydrogen in the diethylenetriamine moiety. A partial chemical structure of the resultant reaction product is shown as follows (geometrical isomers and substitution are not shown, only the major components of the PACE resin (A) are shown, as described above):

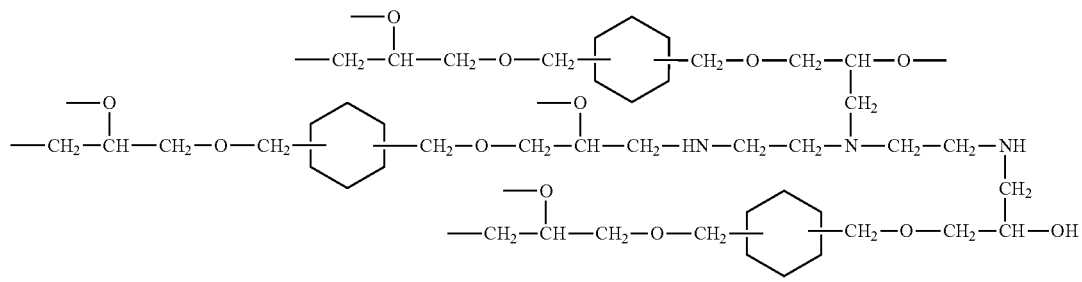

In addition, some minor structures may be present in the adduct of the present invention, for example, 1,2-glycol groups derived from a hydrolysis of an epoxide group in the PACE resin (A), or halomethyl groups derived from an addition of epihalohydrin to a hydroxyl group of an intermediate halohydrin molecule during the process of forming the PACE resin (A).

Other minor structures may be formed via reaction of a backbone hydroxyl group in the adduct of the PACE resin (A). For example, a reaction of the secondary hydroxyl group with a carboxylic acid group present in certain of the reactive compounds (B), results in the formation of a backbone ester linkage in the adduct.

The curable epoxy resin composition of the present invention comprises (I) an adduct as described above; and (II) at least one epoxy resin compound; wherein the epoxy resin compound (II) comprises one or more epoxy resins including a PACE resin (A). The adduct (I) of the present invention as described above acts as a curing agent in the curable composition.

The term "curable" (also referred to as "thermosettable") means that the composition is capable of being subjected to conditions which will render the composition to a cured or thermoset state or condition. The term "cured" or "thermoset" is defined by L. R. Whittington in *Whittington's Dictionary of Plastics* (1968) on page 239 as follows: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials."

The curable epoxy resin composition of the present invention is prepared by mixing the adduct of the present invention, component (I), with the epoxy resin compound, component (II), in amounts which will effectively cure the curable epoxy resin composition, with the understanding that the amounts will depend upon the specific adduct and the epoxy resin compound employed. Generally, the ratio of the adduct of the present invention and the epoxy resin compound is from about 0.60:1 to about 1.50:1, and preferably from about 0.95:1 to about 1.05:1 equivalents of reactive hydrogen atom present in the adduct per equivalent of epoxide group in the epoxy resin compound at the conditions employed for curing.

The epoxy resin which can be used as the epoxy resin compound (II) for the curable composition of the present invention may be any epoxide-containing compound which has an average of more than one epoxide group per molecule. Examples of the epoxy resin include those epoxy resins which are suitable for the epoxy resin compound (C) and the PACE resin (A) described above.

A preferred curable epoxy resin composition of the present invention comprises (I) the adduct of the present invention and the epoxy resin compound (II), wherein the epoxy resin compound comprises one or more of an aliphatic or cycloaliphatic epoxy resin. As a specific example, the adduct of the present invention and the diglycidyl ether of cis-, trans-1,3- and 1,4-cyclohexanedimethanol comprise the curable epoxy resin composition.

Another preferred embodiment of the curable epoxy resin composition of the present invention comprises (I) the adduct of the present invention and (II) the epoxy resin compound, wherein the resin compound comprises one or more of an aliphatic or cycloaliphatic epoxy resin, and wherein the adduct comprises at least one reaction product of a PACE resin (A) and an aliphatic or cycloaliphatic reactive compound (B). The reactive compound (B), for example, comprises an aliphatic or cycloaliphatic diamine, an aliphatic or cycloaliphatic polyamine, or any combination thereof. As a specific example, the (I) adduct of the present invention comprising the reaction product of the PACE resin (A) and a polyalkylenepolyamine (B); and the (II) diglycidyl ether of cis-, trans-1,3- and 1,4-cyclohexanedimethanol comprise the curable epoxy resin composition. As a second specific example, the (I) adduct of the present invention comprising the reaction product of the PACE resin (A) and a polyalkylenepolyamine (B) and the (II) PACE resin comprise the curable epoxy resin composition. The curable epoxy resin composition, when cured, provides a cured epoxy resin free of any aromatic group.

The curable epoxy resin composition of the present invention may also comprise an optional epoxy resin curing agent and/or a curing catalyst.

Examples of the curing agent and/or catalyst useful for the curable epoxy resin composition include aliphatic, cycloaliphatic, polycycloaliphatic or aromatic primary monoamines, aliphatic, cycloaliphatic, polycycloaliphatic or aromatic primary and secondary polyamines, carboxylic acids and anhydrides thereof, aromatic hydroxyl containing compounds, imidazoles, guanidines, urea-aldehyde resins, melamine-aldehyde resins, alkoxylated urea-aldehyde resins, alkoxylated melamine-aldehyde resins, amidoamines, epoxy resin adducts, or any combination thereof.

Particularly preferred examples of the curing agent include methylenedianiline, dicyandiamide, ethylenediamine, diethylenetriamine, triethylene-tetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyltoluenediamine, bis-4-aminocyclo-hexylamine, bis(aminomethyl)norbornane, isophoronediamine, diaminocyclohexane, hexamethylenediamine, piperazine, 1-(2-aminoethyl)piperazine, 4,4'-diaminostilbene; 4,4'-diamino-alpha-methylstilbene; 4,4'-diaminobenzanilide; 2,5-dimethyl-2,5-hexane-diamine; 1,12-dodecanediamine; tris-3-aminopropylamine; 1,3-xylenediamine; 2,2'-bis(4-aminocyclohexyl)propane; 4-(2-aminopropan-2-yl)-1-methylcyclohexan-1-amine (menthane diamine) and any combination thereof.

Particularly preferred examples of the curing catalyst include boron trifluoride, boron trifluoride etherate, aluminum chloride, ferric chloride, zinc chloride, silicon tetrachloride, stannic chloride, titanium tetrachloride, antimony trichloride, boron trifluoride monoethanolamine complex, boron trifluoride triethanolamine complex, boron trifluoride piperidine complex, pyridine-borane complex, diethanolamine borate, zinc fluoroborate, metallic acylates such as stannous octoate or zinc octoate, and any combination thereof.

The curing catalyst may be employed in an amount which will effectively cure the curable epoxy resin composition. The amount of the curing catalyst will also depend upon the particular adduct, epoxy resin, and curing agent, if any, employed in the curable epoxy resin composition.

Generally, the curing catalyst may be used in an amount of from about 0.001 wt % to about 2 wt % of the total curable epoxy resin composition. In addition, one or more of the curing catalysts may be employed to accelerate or otherwise modify the curing process of the curable epoxy resin composition.

The curing agent may be employed in conjunction with the adduct to cure the curable epoxy resin composition. The amounts of combined curing agent and adduct are from about 0.60:1 to about 1.50:1, and preferably from about 0.95:1 to about 1.05:1 equivalents of reactive hydrogen atom collectively in the curing agent and the adduct.

The curable epoxy resin composition may also be blended with at least one additive including, for example, a cure accelerator, a solvent or diluent, a modifier such as a flow modifier and/or a thickener, a reinforcing agent, a filler, a pigment, a dye, a mold release agent, a wetting agent, a stabilizer, a fire retardant agent, a surfactant, or any combination thereof.

The additive may be blended with the adduct or with the epoxy resin compound (II) or with both the adduct and the epoxy resin compound (II) prior to use for the preparation of the curable epoxy resin composition of the present invention.

These additives may be added in functionally equivalent amounts, for example, the pigment and/or dye may be added in quantities which will provide the composition with the desired color. In general, the amount of the additives may be from about zero wt % to about 20 wt %, preferably from about 0.5 wt % to about 5 wt %, and more preferably from about 0.5 wt % to about 3 wt %, based upon the total weight of the curable epoxy resin composition.

The optional cure accelerator which can be employed herein includes, for example, mono, di, tri and tetraphenols; chlorinated phenols; aliphatic or cycloaliphatic mono or dicarboxylic acids; aromatic carboxylic acids; hydroxybenzoic acids; halogenated salicylic acids; boric acid; aromatic sulfonic acids; imidazoles; tertiary amines; aminoalcohols; aminopyridines; aminophenols; mercaptophenols; and any mixture thereof.

Particularly suitable cure accelerators include 2,4-dimethylphenol; 2,6-dimethylphenol; 4-methylphenol; 4-tertiary-butylphenol; 2-chlorophenol; 4-chlorophenol; 2,4-dichlorophenol; 4-nitrophenol; 1,2-dihydroxybenzene; 1,3-dihydroxybenzene; 2,2'-dihydroxybiphenyl; 4,4'-isopropylidenediphenol; valeric acid; oxalic acid; benzoic acid; 2,4-dichlorobenzoic acid; 5-chlorosalicylic acid; salicylic acid; p-toluenesulfonic acid; benzenesulfonic acid; hydroxybenzoic acid; 4-ethyl-2-methylimidazole; 1-methylimidazole; triethylamine; tributylamine; N,N-diethylethanolamine; N,N-dimethylbenzylamine; 2,4,6-tris(dimethylamino)phenol; 4-dimethylaminopyridine; 4-aminophenol; 2-aminophenol; 4-mercaptophenol; and any combination thereof.

Examples of the optional solvent or diluent which can be employed herein include, for example, aliphatic and aromatic hydrocarbons, halogenated aliphatic hydrocarbons, aliphatic ethers, aliphatic nitriles, cyclic ethers, glycol ethers, esters, ketones, amides, sulfoxides, and any combination thereof.

Particularly suitable solvents include pentane, hexane, octane, toluene, xylene, methylethylketone, methylisobutylketone, dimethylsulfoxide, acetonitrile, sulfolane, diethyl ether, tetrahydrofuran, dichloromethane, chloroform, ethylene dichloride, methyl chloroform, ethylene glycol dimethyl ether, diethylene glycol methyl ether, dipropylene glycol methyl ether, N-methylpyrrolidinone, N,N-dimethylacetamide; N,N-dimethylformamide; 1,4-dioxane; and any combination thereof.

The optional modifier such as the thickener and the flow modifier may be employed in amounts of from zero wt % to about 10 wt %, preferably, from about 0.5 wt % to about 6 wt %, and more preferably from about 0.5 wt % to about 4 wt %, based upon the total weight of the curable epoxy resin blend composition.

The optional reinforcing material which may be employed herein includes natural and synthetic fibers in the form of woven fabric, mat, monofilament, multifilament, unidirectional fiber, roving, random fiber or filament, inorganic filler or whisker, or hollow sphere. Other suitable reinforcing material includes glass, carbon, ceramics, nylon, rayon, cotton, aramid, graphite, polyalkylene terephthalates, polyethylene, polypropylene, polyesters, and any combination thereof.

The optional filler which may be employed herein includes, for example, inorganic oxide, ceramic microsphere, plastic microsphere, glass microsphere, inorganic whisker, calcium carbonate, and any combination thereof.

The filler may be employed in an amount of from about zero wt % to about 95 wt %, preferably from about 10 wt % to about 80 wt %, and more preferably from about 40 wt % to about 60 wt %, based upon the total weight of the curable epoxy resin composition.

The process of curing the curable epoxy resin composition of the present invention may be conducted at atmospheric (e.g. 760 mm Hg), superatmospheric or subatmospheric pressures and at a temperature from about 0° C. to about 300° C., preferably from about 25° C. to about 250° C., and more preferably from about 50° C. to about 200° C.

The time required to complete the curing may depend upon the temperature employed. Higher temperatures generally require a shorter period of time whereas lower temperatures generally require longer periods of time. In general, the required time for completion of the curing is from about 1 minute to about 48 hours, preferably from about 15 minutes to about 24 hours, and more preferably from about 30 minutes to about 12 hours.

It is also operable to partially cure the curable epoxy resin composition of the present invention to form a B-stage product and subsequently cure the B-stage product completely at a later time.

The adduct of the present invention may be useful as a aliphatic or cycloaliphatic curing agent for producing a cured epoxy resin, including production of fully aliphatic/cycloaliphatic cured epoxy resin (with no aromatic rings).

The adduct may also be employed in, for example, coatings, especially protective coatings with excellent solvent resistant, moisture resistant, abrasion resistant, and weatherable (UV resistant, non-chalking) properties. Other applications of the adduct of the present invention may include, for example, use as a reactive toughener for thermosets including epoxy resin based thermosets, can and coil coatings, maintenance coatings including coatings for stone, concrete and flooring, marine coatings including anti-fouling coatings, powder coatings including both decorative and functional types, automotive coatings, corrosion resistant coatings, electrical or structural laminates and composites, electronics, aerospace, encapsulation, general castings, coatings for other plastics and metals, sealants, filament windings, moldings, polymer modified concrete, binders, adhesives including window glass adhesives, paints, lacquers and varnishes.

EXAMPLES

The following standard abbreviations are used in the Examples, Reference Examples and Comparative Examples: "GC" stands for gas chromatography (chromatographic); "MS" stands for mass spectrometry (spectrometric); "DSC" stands for differential scanning calorimetry; "Tg" stands for glass transition temperature(s); "EEW" stands for epoxide equivalent weight; "AHEW" stands for amine hydrogen equivalent weight; "DI" stands for deionized; "meq" stands for milliequivalent(s); "eq" stands for equivalent(s); "wt" stands for weight(s); "min" stands for minute(s); "hr" stands for hour(s); "g" stands for gram(s); "mL" stands for milliliter(s); "L" stands for liter(s); "LPM" stands for liter(s) per minute; "μm" stands for micrometer(s); "mm" stands for millimeter(s); "m" stands for meter(s); "cp" stands for centipoise; and "DETA" stands for diethylenetriamine.

In the following Examples, Reference Examples and Comparative Examples, standard analytical equipment and methods are used such as for example, the following:

Gas Chromatographic Analysis: Area %

In the general method, a Hewlett Packard 5890 Series II Plus gas chromatograph was employed using a DB-1 capillary column (61.4 m by 0.25 mm with a 0.25 μm film thickness, Agilent). The column was maintained in the chromatograph oven at a 50° C. initial temperature. Both the injector inlet and flame ionization detector were maintained at 300° C. Helium carrier gas flow through the column was maintained at 1.1 mL per min. For the analyses of the epoxy resins during synthesis or from the rotary evaporation, an initial 50° C. oven temperature with heating at 12° C. per min to a final temperature of 300° C. revealed that essentially all light boiling components, including residual epichlorohydrin, cyclohexanedimethanols and monoglycidyl ethers of the cyclohexanedimethanols had been removed by the rotary evaporation. For the analyses of the PACE resins and re-epoxidized PACE resins, an initial 250° C. oven temperature with heating at 13.3° C. per min to a final temperature of 300° C. was employed for complete elution of all oligomeric components within 50 min total time for the analysis. GC analyses in area percent (%), are not a quantitative measure of any given component.

Samples for GC analysis were prepared by collection of a 0.5 mL aliquot of the slurry product from the epoxidation and addition to a vial containing 1 mL of acetonitrile. After shaking to mix, a portion of the slurry in acetonitrile was loaded into a 1 mL syringe (Norm-Ject, all polypropylene/polyethylene, Henke Sass Wolf GmBH) and passed through a syringe filter (Acrodisc CR 13 with 0.2 μm PTFE membrane, Pall Corporation, Gelman Laboratories) to remove any insoluble debris.

Internally Standardized Gas Chromatographic (GC) Analysis for Weight Percent Residual Diglycidyl Ethers of cis-, trans-1,3- and 1,4-Cyclohexanedimethanol in the Polyfunctional Cycloaliphatic Oligomer Products A single point internal standard method was developed for GC analysis of residual diglycidyl ethers of cis-, trans-1,3- and 1,4-cyclohexanedimethanol remaining in the PACE resin (distillation pot) product and the re-epoxidized PACE resin. Cyclohexanone was selected as the internal standard since it had a retention time that was different from that of any other components observed in the analyses of the UNOXOL™ Diol epoxidation product. For the diglycidyl ether of UNOXOL™ Diol standard, a distillation cut was employed. This distillation cut contained 0.71 wt % monoglycidyl ethers and 99.29 wt % diglycidyl ethers. A 0.2500 g sample of the standard of the diglycidyl ethers plus 0.7500 g of acetonitrile plus 5 μL of cyclohexanone weighing 0.0047 g. were added to a glass vial. Three separate injections were made in the GC and the resultant area counts were averaged for the cyclohexanone and for the diglycidyl ether. This data was used to calculate the internal response factor, as follows:

$$\text{Internal Response Factor} = \frac{\text{(area internal standard) (amount diglycidyl ethers)}}{\text{(amount internal standard) (area diglycidyl ethers)}}$$

An aliquot (0.2500 g) of the PACE resin, acetonitrile (0.7500 g) and cyclohexanone (5 µL, 0.0042 g) were added to a glass vial and analyzed by GC. Using the data from the GC analysis plus the internal response factor, the following calculation was performed:

$$\text{Amount Diglycidyl Ethers} = \frac{\text{(amount internal standard) (area diglycidyl ethers)}}{\text{(Internal Response Factor)} \over \text{(area internal standard)}}$$

In a similar manner, an aliquot (0.2503 g) of the re-epoxidized PACE resin, acetonitrile (0.7502 g) and cyclohexanone (5 µL, 0.0043 g) were added to a glass vial and analyzed by GC.

Percent Epoxide/Epoxide Equivalent Weight Analysis

A standard titration method was used to determine percent epoxide in the various epoxy resins. General methods for this titration are found in the scientific literature, for example, Jay, R. R., "Direct Titration of Epoxy Compounds and Aziridines", Analytical Chemistry, 36, 3, 667-668 (March, 1964). Briefly, in the present adaptation of these methods, the carefully weighed sample (sample weight ranges from 0.17-0.18 g using a scale with 4 decimal place accuracy) was dissolved in dichloromethane (15 mL) followed by the addition of tetraethylammonium bromide solution in acetic acid (15 mL). The resultant solution was treated with 3 drops of crystal violet solution (0.1% w/v in acetic acid) and was titrated with 0.1N perchloric acid in acetic acid on a Metrohm 665 Dosimat titrator (Brinkmann). Titration of a blank sample comprising dichloromethane (15 mL) and tetraethylammonium bromide solution in acetic acid (15 mL) provided correction for solvent background. Percent epoxide and EEW were calculated using the following equations:

$$\% \text{ Epoxide} = \frac{[(\text{mL titrated sample}) - (\text{mL titrated blank})] (0.4303)}{(\text{g sample titrated})}$$

$$EEW = \frac{4303}{\% \text{ epoxide}}$$

Differential Scanning Calorimetry (DSC)

For analysis of curing of the thermosettable blend of the PACE resin or re-epoxidized PACE resin with a DETA adduct of the present invention a DSC 2910 Modulated DSC (TA Instruments) was employed, using a heating rate of 7° C. per min from 0° C. to 300° C. under a stream of nitrogen flowing at 35 cubic centimeters per min Each sample was contained in an aluminum pan and loosely covered (not sealed) with an aluminum lid. The respective sample weight tested is given with the results obtained.

For analysis of Tg of a PACE resin or re-epoxidized PACE resin cured with DETA, the aforementioned parameters were again employed. Each sample was contained in an open aluminum pan. Sample weights cut from the respective cured castings ranged from 20.8 mg to 26.0 mg.

For analysis of curing of the thermosettable blend of the diglycidyl ether of UNOXOL™ Diol (cis-, trans-1,3- and 1,4-cyclohexanedimethanol) cured with a DETA adduct of the present invention and the Tg of the thermoset thereof, the aforementioned conditions were employed, but with an end temperature of 250° C.

I.C.I. Cone and Plate Viscosity

Viscosity was determined on an I.C.I. Cone and Plate Viscometer Viscosity (model VR-4540) at 25° C. The viscometer equipped with a 0-40 poise spindle (model VR-4140) and equilibrated to 25° C. was calibrated to zero. A sample was applied to the viscometer and held for 2 minutes, then the viscosity was checked and the reading was taken after 15 seconds. Five duplicate viscosity tests were completed using fresh aliquots of the particular product being tested. The individual measurements were averaged.

The following Examples, Reference Examples, and Comparative Examples further illustrate the present invention in detail but are not to be construed to limit the scope thereof. It will be apparent to persons skilled in the art that certain changes may be made in the methods described below without departing from the scope of the invention. It is therefore intended that all matter herein disclosed be interpreted as illustrative only and not as limiting the scope of protection sought. Moreover, the process of the present invention is not to be limited by the specific examples set forth above. Rather, these examples are illustrative of the process of the invention.

Reference Example 1

Three Stage Synthesis of Epoxy Resin of UNOXOL™ Diol with Postreaction Temperature Held at 40° C.

Epoxidation of UNOXOL™ Diol was performed using three stages of aqueous sodium hydroxide addition with postreaction at 40° C. followed by fractional vacuum distillation to separate the constituents of the epoxy resin:

A. Epoxidation Reaction

A 5 L, 4 neck, glass, round bottom reactor was charged with UNOXOL™ Diol (432.63 g, 3.0 moles, 6.0 hydroxyl eq), epichlorohydrin (1110.24 g, 12.0 moles, 2:1 epichlorohydrin:UNOXOL™ Diol hydroxyl eq ratio), toluene (2.5 L), and benzyltriethylammonium chloride (43.62 g, 0.1915 mole) in the indicated order. [UNOXOL™ cyclic dialcohol is a registered trademark of Union Carbide Corporation.] The reactor was additionally equipped with a condenser (maintained at 0° C.), a thermometer, a Claisen adaptor, an overhead nitrogen inlet (1 LPM $N_2$ used), and a stirrer assembly (Teflon™ paddle, glass shaft, variable speed motor). [Teflon™ fluorocarbon resin is a trademark of E.I. duPont de Nemours.] A controller monitored the temperature registered on the thermometer in the reactor and provided heating via the heating mantle placed under the reactor as well as cooling delivered by a pair of fans positioned on the reactor exterior. Sodium hydroxide (360.0 g, 9.0 moles) dissolved in DI water (360 g) for the initial addition was added to a side arm vented addition funnel, sealed with a ground glass stopper, then attached to the reactor. Stirring commenced to give a 22.5° C. mixture followed by commencement of dropwise addition of the aqueous sodium hydroxide solution. The reaction mixture was allowed to self-heat to 40° C. during the aqueous sodium hydroxide addition time and then held at that temperature via cooling from the fans as needed. Thus, after 196 min the reaction temperature first reached 40° C. and then remained at 39-40° C. for the remainder of the aqueous sodium hydroxide addition. Addition of the aqueous sodium hydroxide required a total of 233 min. Fourteen min after completion of the aqueous sodium hydroxide addition, heating commenced to maintain the reaction at 40° C. After 16.2 hr of postreaction at 40° C., stirring ceased, and the reactor contents were allowed to settle. The organic layer was decanted from the reactor followed by addition of 1.5 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 2.21 area % light components, 1.27 area % unreacted cis-, trans-1,3- and 1,4-cyclohexanedimethanol; 43.13 area % monoglycidyl ethers, 0.25 area % of a pair of components associated with the diglycidyl ether peaks, 50.20 area % diglycidyl ethers, and 2.94 area % oligomers that were volatile under the conditions of the GC analysis.

The organic layer was reloaded into the reactor along with fresh benzyltriethylammonium chloride (21.81 g, 0.0958 mole). Sodium hydroxide (180 g, 4.5 moles) dissolved in DI water (180 g) was added to a side arm vented addition funnel, sealed with a ground glass stopper, then attached to the reactor. Stirring commenced to give a 23.5° C. mixture followed by commencement of dropwise addition of the aqueous sodium hydroxide solution. The reaction mixture was allowed to self-heat during the aqueous sodium hydroxide addition time. Thus, after 119 min 100% of the aqueous sodium hydroxide was added causing the reaction temperature to reach a maximum of 30.5° C. Three min after completion of the aqueous sodium hydroxide addition, heating commenced to bring the reaction to 40° C. after 11 min of heating. After 15.8 hr of postreaction at 40° C., stirring ceased, and the reactor contents were allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 5.62 area % light components, no detectable unreacted cis-, trans-1,3- and 1,4-cyclohexanedimethanol; 12.63 area % monoglycidyl ethers, 0.64 area % of a pair of components associated with the diglycidyl ether peaks, 76.30 area % diglycidyl ethers, and 4.81 area % oligomers that were volatile under the conditions of the GC analysis.

The organic layer was reloaded into the reactor along with fresh benzyltriethylammonium chloride (10.91 g, 0.0479 mole). Sodium hydroxide (90 g, 2.25 moles) dissolved in DI water (90 g) was added to a side arm vented addition funnel, sealed with a ground glass stopper, then attached to the reactor. Stirring commenced to give a 23° C. mixture followed by commencement of dropwise addition of the aqueous sodium hydroxide solution. The reaction mixture was allowed to self-heat during the aqueous sodium hydroxide addition time. Thus, after 50 min 66.67% of the aqueous sodium hydroxide was added causing the reaction temperature to reach a maximum of 24.5° C. This temperature was maintained for the remainder of the aqueous sodium hydroxide addition. Addition of the aqueous sodium hydroxide required a total of 61 min Immediately after completion of the aqueous sodium hydroxide addition, heating commenced to bring the reaction to 40° C. after 22 min of heating. After 16.7 hr of postreaction at 40° C., stirring ceased, and the reactor contents were allowed to settle. The organic layer was decanted from the reactor followed by addition of 1.0 L of DI water to the salt and residual toluene left behind in the reactor. After addition into a 2 L separatory funnel and settling, the toluene layer which separated from the aqueous salt solution was recovered and combined back with the decanted organic layer. The aqueous layer was discarded as waste. GC analysis after normalization to remove solvents (acetonitrile and toluene) and unreacted epichlorohydrin revealed the presence of 8.62 area % light components, no detectable unreacted cis-, trans-1,3- and 1,4-cyclohexanedimethanol; 9.91 area % monoglycidyl ethers, 0.46 area % of a pair of components associated with the diglycidyl ether peaks, 75.29 area % diglycidyl ethers, and 5.72 area % oligomers that were volatile under the conditions of the GC analysis.

B. Epoxy Resin Product Isolation

After removal of the aqueous layer from the reaction with the third aqueous sodium hydroxide addition, the organic layer was equally split between the pair of separatory funnels and the contents of each respective separatory funnel then washed with DI water (400 mL) by vigorously shaking. The washed product was allowed to settle for 2 hours, then the aqueous layer was removed and discarded as waste. A second wash was completed using the aforementioned method, with settling overnight (20 hr) required to fully resolve the organic and aqueous layers. The combined, hazy organic solution was filtered through a bed of anhydrous, granular sodium sulfate in a 600 mL fritted glass funnel providing a transparent filtrate.

Rotary evaporation of the filtrate using a maximum oil bath temperature of 100° C. to a final vacuum of 2.4 mm of Hg removed the bulk of the volatiles. A total of 712.20 g of light yellow colored, transparent liquid was recovered after completion of the rotary evaporation. GC analysis after normalization to remove solvent (acetonitrile) revealed the presence of 9.76 area % monoglycidyl ethers, 0.38 area % of a pair of components associated with the diglycidyl ether peaks, 82.39 area % diglycidyl ethers, and 7.47 area % oligomers that were volatile under the conditions of the GC analysis. Thus, GC analysis revealed that essentially all light boiling components, including residual epichlorohydrin, had been removed.

C. Fractional Vacuum Distillation

A portion (699.19 g) of the product from the rotary evaporation was added to a 1 L, 3 neck, glass, round bottom reactor equipped with magnetic stiffing and a thermometer for monitoring the pot temperature. A one piece integral vacuum jacketed Vigreux distillation column with distillation head was used. The distillation column nominally provided 9 to 18 theoretical plates depending on the mode of operation. A second section of jacketed Vigreux column was added between the one piece integral vacuum jacketed Vigreux distillation column with head and the reactor to provide an additional 9 to 18 theoretical plates. The distillation head was equipped with an overhead thermometer, air cooled condenser, a receiver and a vacuum takeoff. A vacuum pump was employed along with a liquid nitrogen trap and an in-line digital thermal conductivity vacuum gauge. Stiffing commenced followed by application of full vacuum then progressively increased heating using a thermostatically controlled heating mantle. A clean receiver was used to collect each respective distillation cut. During the distillation, the initial distillation cuts were taken to sequentially remove all components boiling below the cyclohexanedimethanols, all unreacted cyclohexanedimethanols, and the bulk of the monoglycidyl ethers. The final distillation cuts sought to selectively remove diglycidyl ether, leaving the oligomeric product (279.39 g) in the distillation pot. GC analysis using a cyclohexanone internal standard revealed that the oligomers contained residual 13.91 wt % diglycidyl ether with the balance as the oligomers. After normalization to remove the peaks associated with acetonitrile solvent and the diglycidyl ether, the GC analysis demonstrated the following oligomeric components containing multiple isomers:

2.54 area % 2-propanol, 1-(oxiranylmethoxy)-3-[[3(or 4)-[(oxiranylmethoxy)methyl]cyclohexyl]methoxy]-and oxirane, 2-[[2-chloro-1-[[[3(or 4)-[(oxiranylmethoxy)methyl]cyclohexyl]methoxy]methyl]ethoxy]methyl]-

27.80 area % oxirane, 2-[[[3(or 4)-4-[[2,3-bis(oxiranylmethoxy)propoxy]methyl]cyclohexyl]methoxy]methyl]-

15.91 area % 2-propanol, 1,3-bis[[3(or 4)-[(oxiranylmethoxy)methyl]cyclohexyl]methoxy]-

53.74 area % oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy]methyl]

Titration demonstrated an EEW of 193.62. I.C.I. cone and plate viscosity was 3268 cp.

Reference Example 2

Re-epoxidation of Polyfunctional Cycloaliphatic Oligomer Product

Re-epoxidation of the PACE resin (Reference Example 1) was performed using two stages of aqueous sodium hydroxide addition:

A. Re-epoxidation Reaction

A 5 L, 4 neck, glass, round bottom reactor was charged with polyfunctional cycloaliphatic oligomer product (250.0 g), epichlorohydrin (277.7 g, 3.0 moles), toluene (1.0 L) and benzyltriethylammonium chloride (10.91 g, 0.0479 mole). The reactor was additionally equipped as specified above (Reference Example 1). The polyfunctional cycloaliphatic oligomer product used came from Reference Example 1, Fractional Vacuum Distillation. Sodium hydroxide (90.0 g, 2.25 moles) dissolved in DI water (90 g) for the initial addition was added to a side arm vented addition funnel, sealed with a ground glass stopper, then attached to the reactor. Stirring commenced to give a 23° C. mixture followed by commencement of dropwise addition of the aqueous sodium hydroxide solution. The reaction mixture was allowed to self-heat to 25° C. during the aqueous sodium hydroxide addition. Thus, after 67 min the reaction temperature first reached 25° C. and then remained at 25° C. for the remainder of the aqueous sodium hydroxide addition. Addition of the aqueous sodium hydroxide required a total of 75 min One min after completion of the aqueous sodium hydroxide addition, heating commenced to bring the reaction to 40° C. after 22 min of heating. After 21.0 hr of postreaction at 40° C., stirring ceased, and the reactor contents were allowed to settle. The organic layer was decanted from the reactor and processed as specified above (Reference Example 1).

The organic layer was reloaded into the reactor along with fresh benzyltriethylammonium chloride (10.91 g, 0.0479 mole). Sodium hydroxide (90.0 g, 2.25 moles) dissolved in DI water (90 g) was added to a side arm vented addition funnel, sealed with a ground glass stopper, then attached to the reactor. Stirring commenced to give a 24° C. mixture followed by commencement of dropwise addition of the aqueous sodium hydroxide solution. The reaction mixture was allowed to self-heat during the aqueous sodium hydroxide addition time. Thus, after 43 min the reaction temperature first reached 25° C. and then remained at 25° C. for the remainder of the aqueous sodium hydroxide addition. Addition of the aqueous sodium hydroxide required a total of 62 min Immediately after completion of the aqueous sodium hydroxide addition, heating commenced to bring the reaction to 40° C. after 28 min of heating. After 16.7 hr of postreaction at 40° C., stirring ceased, and the reactor contents were allowed to settle. The organic layer was decanted from the reactor and processed as specified above (Reference Example 1).

B. Epoxy Resin Product Isolation

The organic layer from the reaction was processed as specified above (Reference Example 1). Rotary evaporation of the filtrate using a maximum oil bath temperature of 100° C. to a final vacuum of 2.7 mm of Hg removed the bulk of the volatiles. A total of 251.14 g of light amber colored, transparent liquid was recovered after completion of the rotary evaporation. GC analysis using a cyclohexanone internal standard revealed that the oligomers contained residual 10.34 wt % diglycidyl ether with the balance as the oligomers. After normalization to remove the peaks associated with acetonitrile solvent and the diglycidyl ether, the GC analysis demonstrated the following oligomeric components containing multiple isomers:

0.95 area % 2-propanol, 1-(oxiranylmethoxy)-3-[[3(or 4)-[(oxiranylmethoxy)methyl]cyclohexyl]methoxy]-and oxirane, 2-[[2-chloro-1-[[[3(or 4)-[(oxiranylmethoxy)methyl]cyclohexyl]methoxy]methyl]ethoxy]methyl]-

28.56 area % oxirane, 2-[[[3(or 4)-[[2,3-bis(oxiranylmethoxy)propoxy]methyl]cyclohexyl]methoxy]methyl]-

70.49 area % oxirane, 2-[[2-[[3(or 4)-[(oxiranylmethoxy)methyl]cyclohexyl]methoxy]-1-[[[3(or 4)-[(oxiranylmethoxy)methyl]cyclohexyl]methoxy]methyl]ethoxy] methyl]-

Titration demonstrated an EEW of 181.6. I.C.I. cone and plate viscosity was 2972 cp.

Example 1

Preparation and Characterization of an Adduct of DETA and Re-epoxidized Polyfunctional Cycloaliphatic Oligomer Epoxy Resin A 1 L 3 neck, glass, round bottom, reactor was charged under nitrogen with DETA (412.7 g, 4.0 moles, 20 amine hydrogen eq). The DETA used was a commercial grade product obtained from Sigma-Aldrich Chemical Company with a purity specification of 99%. The reactor was additionally equipped with a condenser (maintained at 24° C.), a thermometer, a Claisen adaptor, an overhead nitrogen inlet (1 LPM $N_2$ used), and magnetic stirring. A portion (36.3 g, 0.20 epoxide eq) of re-epoxidized PACE resin from Reference Example 2 above was added to a side arm vented addition funnel, and then attached to the reactor. Stirring and heating using a thermostatically controlled heating mantle commenced to give a 40° C. solution. Dropwise addition of the re-epoxidized PACE resin commenced while maintaining the reaction temperature at 40-41° C. After 3.75 hr, the dropwise addition was completed. The resultant light yellow colored solution was stirred and maintained at 40° C. for the next 43.3 hr followed by rotary evaporation at 75° C. to remove the bulk of the excess DETA. Additional rotary evaporation was completed using a maximum 140° C. oil bath temperatures to a vacuum of 4.3 mm Hg. A transparent, light yellow colored, liquid adduct product was recovered from the rotary evaporation (56.14 g). GC analysis of an aliquot of the adduct product revealed that complete reaction of all re-epoxidized PACE resin had occurred. Titration of a portion of the adduct indicated an AHEW of 80.79.

Example 2

Curing of Re-epoxidized Polyfunctional Cycloaliphatic Oligomer Epoxy Resin with Adduct of DETA and Re-epoxidized Polyfunctional Cycloaliphatic Oligomer Epoxy Resin A mixture of re-epoxidized PACE resin from Reference Example 2 (8.358 g, 0.046 epoxide eq) and a portion (3.718 g, 0.046 amine hydrogen eq) of the DETA adduct of re-epoxidized PACE resin from Example 1 were weighed into a glass vial then vigorously stirred together to give a hazy liquid. DSC analysis was completed using a 14.6 mg portion of the hazy liquid. An exothermic transition, attributable to reaction of the reactive hydrogen atoms in the adduct with the epoxide groups, was observed with an onset temperature of 52.1° C., a maximum at 112.9° C., an enthalpy of 178.8 J/g, and an end temperature of 195.5° C.

Example 3

B-Staging of Re-epoxidized Polyfunctional Cycloaliphatic Oligomer Epoxy Resin with Adduct of DETA and Re-epoxidized Polyfunctional Cycloaliphatic Oligomer Epoxy Resin and Preparation of a Clear, Unfilled Casting for Analysis of Glass Transition Temperature The remaining portion of the curable mixture from Example 2 was gently heated to 100° C., transforming the hazy liquid to a transparent, light yellow colored solution. This transparent, liquid state was maintained as heating ceased and the liquid began cooling. The solution was added to an aluminum dish (2.5 inch diameter by 0.5 inch deep) and then placed in an oven which had been preheated to 100° C. After 1 hr at 100° C., the sample was removed and placed in an oven which had been preheated to 150° C. After 1 hr at 150° C., the sample was removed and placed in an oven which had been preheated to 200° C. Heating to the oven ceased and the sample was allowed to slowly cool overnight. The cured product was a rigid, light amber colored, transparent solid. A portion (24.2 mg) of the cured product was tested by DSC analysis using the method previously given and gave a Tg of 69.7° C. A second scanning of the cured product using the method previously given gave a Tg of 70.0° C.

Example 4

Curing of High Purity Diglycidyl Ether of cis-, trans-1,3- and 1,4-Cyclohexanedimethanol with Adduct of DETA and Re-epoxidized Polyfunctional Cycloaliphatic Oligomer Epoxy Resin A portion (5.3056 g, 0.0412 epoxide eq) of diglycidyl ether of UNOXOL™ Diol (cis-, trans-1,3- and 1,4-cyclohexanedimethanol) obtained from the fractional vacuum distillation of the epoxy resin of UNOXOL™ Diol from a three stage synthesis was added to a glass vial. G.C. analysis of the diglycidyl ether demonstrated 99.49 wt % diglycidyl ethers, 0.16 wt % monoglycidyl ethers, 0.35 wt. % of a pair of minor peaks associated with the diglycidyl ether peak and no detectable oligomers. A portion (3.328 g, 0.0412 amine hydrogen eq) of the DETA adduct of re-epoxidized PACE resin from Example 1 was added to the glass vial then the contents were vigorously stirred together to give a hazy liquid which rapidly separated on standing. DSC analysis was completed using a 10.6 mg portion of the stirred, hazy liquid. An exothermic transition, attributable to reaction of the reactive hydrogen atoms in the adduct with the epoxide groups, was observed with an onset temperature of 83.2° C., a maximum at 142.0° C., an enthalpy of 169.1 J/g, and an end temperature of 224.8° C.

Example 5

B-Staging of High Purity Diglycidyl Ether of cis-, trans-1,3- and 1,4-Cyclohexanedimethanol with Adduct of DETA and Re-epoxidized Polyfunctional Cycloaliphatic Oligomer Epoxy Resin and Preparation of a Clear, Unfilled Casting for Analysis of Glass Transition Temperature The remaining portion of the curable mixture from Example 4 was gently heated to 100° C., transforming the hazy liquid to a transparent, light yellow colored solution. This transparent, liquid state was maintained as heating ceased and the liquid began cooling. The solution was added to an aluminum dish and then placed in an oven and cured using the method of Example 3. The cured product was a rigid, light amber colored, transparent solid. A portion (26.5 mg) of the cured product was tested by DSC analysis using the method previously given and gave a Tg of 64.8° C. A second scanning of the cured product using the method previously given gave a Tg of 62.0° C. A third scanning of the cured product using the method previously given gave a Tg of 64.7° C.

Comparative Example A

Analysis of Oligomer Structure Produced from Epoxidation of cis-, trans-1,4-Cyclohexanedimethanol Using Lewis Acid Catalyzed Coupling Structures proposed from GC-MS analysis of a sample of a commercial grade of an epoxy resin of cis-, trans-1,4-cyclohexanedimethanol (Erisys™ GE-22S, CVC Thermoset Specialties) produced via epoxidation which employed Lewis acid catalyzed coupling are given, as follows (geometrical isomers and substitution are not shown):

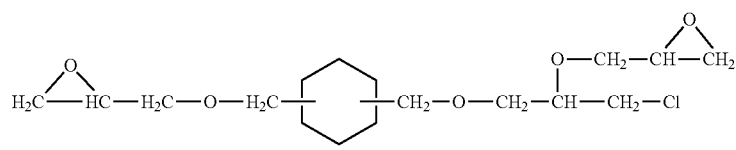

-continued

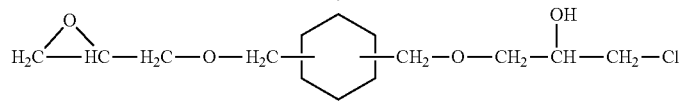

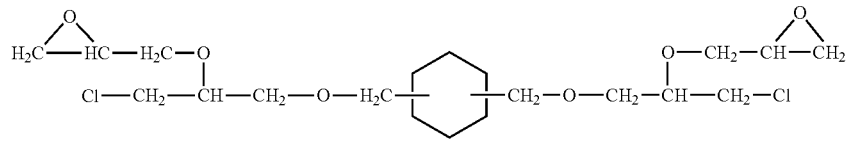

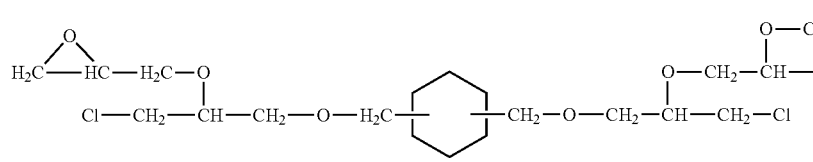

The diglycidyl ether shown as the first structure is the major product, comprising >80 area % of the combined oligomer product. There are no oligomer components in common with those of the PACE resin from the quaternary ammonium halide catalyzed route (Reference Examples 1C. and 2B.) Unlike the product produced from the quaternary ammonium halide catalyzed route, the product from the Lewis acid catalyzed route cannot be designated as "polyfunctional", since the highest functionality components are only diglycidyl ethers. It follows that the product from the Lewis acid catalyzed route cannot be used to produce an adduct comprising a polyfunctional aliphatic or cycloaliphatic epoxy resin since no polyfunctional epoxy resin precursor components are present. The third structure shown, a monoglycidyl ether monochlorohydrin, indicates that further treatment with aqueous sodium hydroxide is needed to complete the dehydrochlorination step in the epoxidation. Notably, four of the oligomeric components possess chlorine bound in the form of chloromethyl groups. The presence of this bound chloride most likely would preclude the use of this oligomer product for many applications including electronics and coatings used in contact with food.

Comparative Example B

Curing of Re-epoxidized Polyfunctional Cycloaliphatic Oligomer Epoxy Resin with DETA A mixture of re-epoxidized PACE resin from Reference Example 2 (11.3141 g, 0.0623 epoxide eq) and DETA (1.29 g, 0.06252 amine hydrogen eq) were weighed into a glass vial then vigorously stirred together to give a homogeneous mixture. DSC analysis was completed using a 11.2 mg portion of the solution. An exothermic transition, attributable to reaction of the reactive hydrogen atoms in the DETA with the epoxide groups, was observed with an onset temperature of 49.4° C., a maximum at 119.6° C., an enthalpy of 466.9 J/g, and an end temperature of 202.9° C.

Comparative Example C

Preparation of a Clear, Unfilled Casting of Re-epoxidized Polyfunctional Cycloaliphatic Oligomer Epoxy Resin Cured with DETA and Analysis of Glass Transition Temperature The remaining portion of the curable mixture from Comparative Example B was added to an aluminum dish (2.5 inch diameter by 0.5 inch deep) and then placed in an oven which had been preheated to 70° C. After 1 hr at 70° C., the sample was removed and placed in an oven which had been preheated to 100° C. After 1 hr at 100° C., the sample was removed and placed in an oven which had been preheated to 125° C. Finally, after 1 hr at 125° C., the sample was removed and placed in an oven which had been preheated to 150° C. and held at that temperature for 1 hr. Heating to the oven ceased and the sample was allowed to slowly cool overnight. The cured product was a rigid, light amber colored, transparent solid. A portion (20.8 mg) of the cured product was tested by DSC analysis using the method previously given (end temperature was 250° C.) and gave a Tg of 67.2° C. A second scanning of the cured product using the method previously given gave a Tg of 67.0° C.

Comparative Example D

Curing of High Purity Diglycidyl Ether of cis-, trans-1,3- and 1,4-Cyclohexanedimethanol with DETA A portion (5.0226 g, 0.03900 epoxide eq) of diglycidyl ether of UNOXOL™ Diol (cis-, trans-1,3- and 1,4-cyclohexanedimethanol) obtained from the fractional vacuum distillation of the epoxy resin of UNOXOL™ Diol from a three stage synthesis was added to a glass vial. G.C. analysis results are given in Example 4 above. DETA (0.81 g, 0.03926 amine hydrogen eq) was added to the glass vial then the contents were vigorously stirred together to give a homogeneous mixture. DSC analysis was completed using a 11.4 mg portion of the solution. An exothermic transition, attributable to reaction of the reactive hydrogen atoms in the adduct with the epoxide groups, was observed with an onset temperature of 44.9° C., a maximum at 116.8° C., an enthalpy of 719.7 J/g, and an end temperature of 203.8° C.

Comparative Example E

Preparation of a Clear, Unfilled Casting of High Purity Diglycidyl Ether of cis-, trans-1,3- and 1,4-Cyclohexanedimethanol Cured with DETA and Analysis of Glass Transition Temperature The remaining portion of the curable mixture from Comparative Example D was added to an aluminum dish and then placed in an oven and cured using the method of Comparative Example C. The cured product was a rigid, light amber colored, transparent solid. Portions (28.5 and 32.4 mg) of the cured product were tested by DSC analysis using the method previously given (end temperature was 250° C.). The casting obtained from curing diglycidyl ether of cis-, trans-1,3- and 1,4-cyclohexanedimethanol with DETA exhibited regions of deep channels or cracks which were first observed during the initial curing at 70° C. It is possible that the very high enthalpy on curing (Comparative Example D) may be responsible for the channels propagated through the casting. Two separate samples of the casting were randomly taken and for the DSC analyses (Tables I and II). In the DSC analyses of both Samples 1 and 2, residual exothermicity was present in the first scanning and indicated incomplete cure. Upon second scanning the residual exothermicity was no longer detected in Sample 2, but was still present Sample 1 but in a reduced amount. The large enthalpy associated with this curable mixture (Comparative Example D) may be responsible for the incomplete cure, with cure occurring so energetically that the mobility of amine groups and epoxide groups in the thermosetting matrix is restricted.

TABLE I

Glass Transition Temperatures for Diglycidyl Ether of cis-, trans-1,3- and 1,4-Cyclohexanedimethanol Cured with Diethylenetriamine: Sample 1

| Tg (° C.) | Onset of Residual Exothermicity (° C.) | Peak Exotherm (° C.) | End of Residual Exothermicity (° C.) | Enthalpy (J/g) |
|---|---|---|---|---|
| 64.9 | 151.9 | 175.9 | 239.0 | 5.6 |
| 65.5 (second scanning) | 157.0 | 179.3 | 224.8 | 4.7 |

TABLE II

Glass Transition Temperatures for Diglycidyl Ether of cis-, trans-1,3- and 1,4-Cyclohexanedimethanol Cured with Diethylenetriamine: Sample 2

| Tg (° C.) | Onset of Residual Exothermicity (° C.) | Peak Exotherm (° C.) | End of Residual Exothermicity (° C.) | Enthalpy (J/g) |
|---|---|---|---|---|
| 62.9 | 155.8 | 180.6 | 241.4 | 3.6 |
| 62.4 (second scanning) | none detected | | | |

What is claimed is:

1. An epoxy resin adduct comprising the reaction product of (A) at least one polyfunctional aliphatic or cycloaliphatic epoxy resin; and (B) at least one reactive compound; and optionally (C) an epoxy resin compound different from the polyfunctional aliphatic or cycloaliphatic epoxy resin (A);
   wherein the polyfunctional aliphatic or cycloaliphatic epoxy resin is isolated and separated from a first epoxy resin product, wherein the first epoxy resin product and the polyfunctional aliphatic or cycloaliphatic epoxy resin are formed by reacting (i) an aliphatic or cycloaliphatic hydroxyl-containing material with (ii) an epihalohydrin and (iii) a basic-acting substance in the presence of (iv) a non-Lewis acid catalyst, and (v) optionally one or more solvents;
   wherein the reactive compound (B) comprises one or more compounds having two or more reactive hydrogen atoms per molecule and the reactive hydrogen atoms are reactive with epoxide groups; and
   wherein essentially all epoxide groups in (A) are reacted with the reactive hydrogen groups of (B).

2. The adduct of claim 1, wherein the aliphatic or cycloaliphatic hydroxyl-containing material comprises: cis-, trans-1,3- and 1,4cyclohexanedimethanol; cis-, trans- 1,4- cyclohexanedimethanol; cis-, trans-1,3cyclohexanedimethanol; or 1,1- cyclohexanedimethanol.

3. The adduct of claim 1, wherein the reactive compound comprises an alkyleneamine or polyalkylenepolyamine, a di- or polyamine, or a primary monoamine.

4. The adduct of claim 1, wherein the epoxy resin adduct comprises the reaction product of (A) said at least one polyfunctional aliphatic or cycloaliphatic epoxy resin,(B) said at least one reactive compound, and (C) an epoxy resin compound different from the polyfunctional aliphatic or cycloaliphatic epoxy resin (A).

5. The adduct of claim 4, wherein the epoxy resin compound (C) comprises an aliphatic or cycloaliphatic epoxy resin.

6. The adduct of claim 1, wherein the polyfunctional aliphatic or cycloaliphatic epoxy resin comprises the reaction product of a polyfunctional aliphatic or cycloaliphatic epoxy resin and an epihalohydrin.

7. A process for preparing the epoxy resin adduct of claim 1 comprising reacting: (A) the at least one polyfunctional aliphatic or cycloaliphatic epoxy resin
   and (B) the at least one reactive compound.

8. A curable epoxy resin composition comprising (I) the adduct of claim 1;
   and (II) at least one epoxy resin compound.

9. The composition of claim 8, wherein the at least one epoxy resin compound (II) comprises (i) an oligomeric polyfunctional aliphatic or cycloaliphatic epoxy resin, (ii) an epoxy resin compound other than the oligomeric polyfunctional aliphatic or cycloaliphatic epoxy resin (i), or (iii) a mixture of epoxy resin (i) and epoxy resin compound (ii).

10. The composition of claim 8, wherein the at least one epoxy resin compound (II) comprises the diglycidyl ether of cis-, trans-1,3- and 1,4-cyclohexanedimethanol.

11. A partially (B-staged) cured thermoset product of the curable epoxy resin composition of claim 8.

12. A process of partially curing (B-staging) an epoxy resin composition comprising partially curing the epoxy resin composition of claim 8.

13. A cured thermoset product of the curable epoxy resin composition of claim 8.

14. A process of curing an epoxy resin composition comprising totally curing the epoxy resin composition of claim 8.

15. A process for preparing a curable epoxy resin composition comprising admixing (I) the adduct of claim 1; and (II) at least one epoxy resin compound.

16. The process of claim 15, including the step of heating the admixture at a temperature of from about 0° C. to about 300° C.

17. An article comprising the composition of claim 1.

18. The adduct of claim 1, wherein the polyfunctional aliphatic or cycloaliphatic epoxy resin contains no more than 20% by weight of fully epoxidized aliphatic or cycloaliphatic hydroxyl containing material.

19. The adduct of claim 1, wherein the ratio of (B) the reactive compound and (A) the at least one polyfunctional aliphatic or cycloaliphatic epoxy resin is from 2:1 to 100:1 equivalents of the reactive hydrogen atom in (B) the reactive compound per equivalent of epoxide groups in (A) the epoxy resin.

\* \* \* \* \*